(12) United States Patent
Forston et al.

(10) Patent No.: US 10,046,525 B2
(45) Date of Patent: *Aug. 14, 2018

(54) ADVANCED VARIABLE RADIUS LAMINATED COMPOSITE RADIUS FILLER

(71) Applicant: The Boeing Company, Chicago, IL (US)

(72) Inventors: Gabriel Z. Forston, Everett, WA (US); Benjamin Wen-Jun Su, Everett, IL (US); Russell Rufino, Ridley Park, PA (US)

(73) Assignee: The Boeing Company, Chicago, IL (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/282,616

(22) Filed: Sep. 30, 2016

(65) Prior Publication Data

US 2018/0093431 A1    Apr. 5, 2018

(51) Int. Cl.
*B32B 3/00* (2006.01)
*B29C 70/34* (2006.01)
*B29C 65/00* (2006.01)
B29K 63/00 (2006.01)
B29K 105/08 (2006.01)
B29K 307/04 (2006.01)
B29L 31/30 (2006.01)

(52) U.S. Cl.
CPC .......... *B29C 70/345* (2013.01); *B29C 66/131* (2013.01); *B29C 66/723* (2013.01); *B29C 66/7212* (2013.01); *B29K 2063/00* (2013.01); *B29K 2105/0881* (2013.01); *B29K 2307/04* (2013.01); *B29L 2031/3085* (2013.01); *Y10T 428/24099* (2015.01); *Y10T 428/24124* (2015.01)

(58) Field of Classification Search
CPC ................ Y10T 428/24099; Y10T 428/24124
See application file for complete search history.

(56) References Cited

U.S. PATENT DOCUMENTS

| | | | |
|---|---|---|---|
| 5,939,007 A | 8/1999 | Iszczyszyn et al. | |
| 6,562,436 B2 | 5/2003 | George et al. | |
| 7,380,753 B2 | 6/2008 | Kairouz | |
| 9,327,470 B1 * | 5/2016 | Krajca | B29D 99/0014 |
| 9,359,060 B2 * | 6/2016 | Kajita | B64C 1/064 |

(Continued)

OTHER PUBLICATIONS

U.S. Appl. No. 14/954,960, filed Nov. 30, 2015.

(Continued)

*Primary Examiner* — Alexander S Thomas

(57) ABSTRACT

A composite radius filler include a base portion and a tip portion. The base portion is formed of composite plies varying in overall width along an overall lengthwise direction and defining a variable cross-sectional shape of the base portion along the lengthwise direction. The base portion includes at least one transition zone having a transition start and a transition end along the lengthwise direction. The composite plies of the base portion are arranged in one or more stacks each stack having a predetermined fiber orientation angle sequence and a stack width that changes within the transition zone. The tip portion includes a plurality of composite plies formed into a generally triangular cross-sectional shape and stacked on top of the base portion.

22 Claims, 23 Drawing Sheets

(56) References Cited

U.S. PATENT DOCUMENTS

| | | |
|---|---|---|
| 2002/0031641 A1 | 3/2002 | George et al. |
| 2008/0111024 A1 | 5/2008 | Lee et al. |
| 2009/0041974 A1 | 2/2009 | Gleason et al. |
| 2009/0317587 A1 | 12/2009 | Deobald et al. |
| 2010/0024966 A1* | 2/2010 | Felip .................... B29C 53/265 156/196 |
| 2010/0170988 A1 | 7/2010 | Meyer et al. |
| 2011/0143081 A1 | 6/2011 | Fritz et al. |
| 2012/0074265 A1 | 3/2012 | Hallander et al. |
| 2013/0105072 A1* | 5/2013 | Anderson ............... B29C 70/52 156/264 |
| 2015/0125655 A1 | 7/2015 | Kajita |
| 2016/0107432 A1 | 4/2016 | Krajca et al. |

OTHER PUBLICATIONS

Blom et al., "A Theoretical Model to Study the Influence of Tow-drop Areas on the Stiffness and Strength of Variable-stiffness Laminates," Journal of Composite Materials, vol. 00, No. 00/2008, First, published on Jan. 29, 2009.

EPO, Extended European Search Report for Application 17186590, dated Mar. 9, 2018.

* cited by examiner

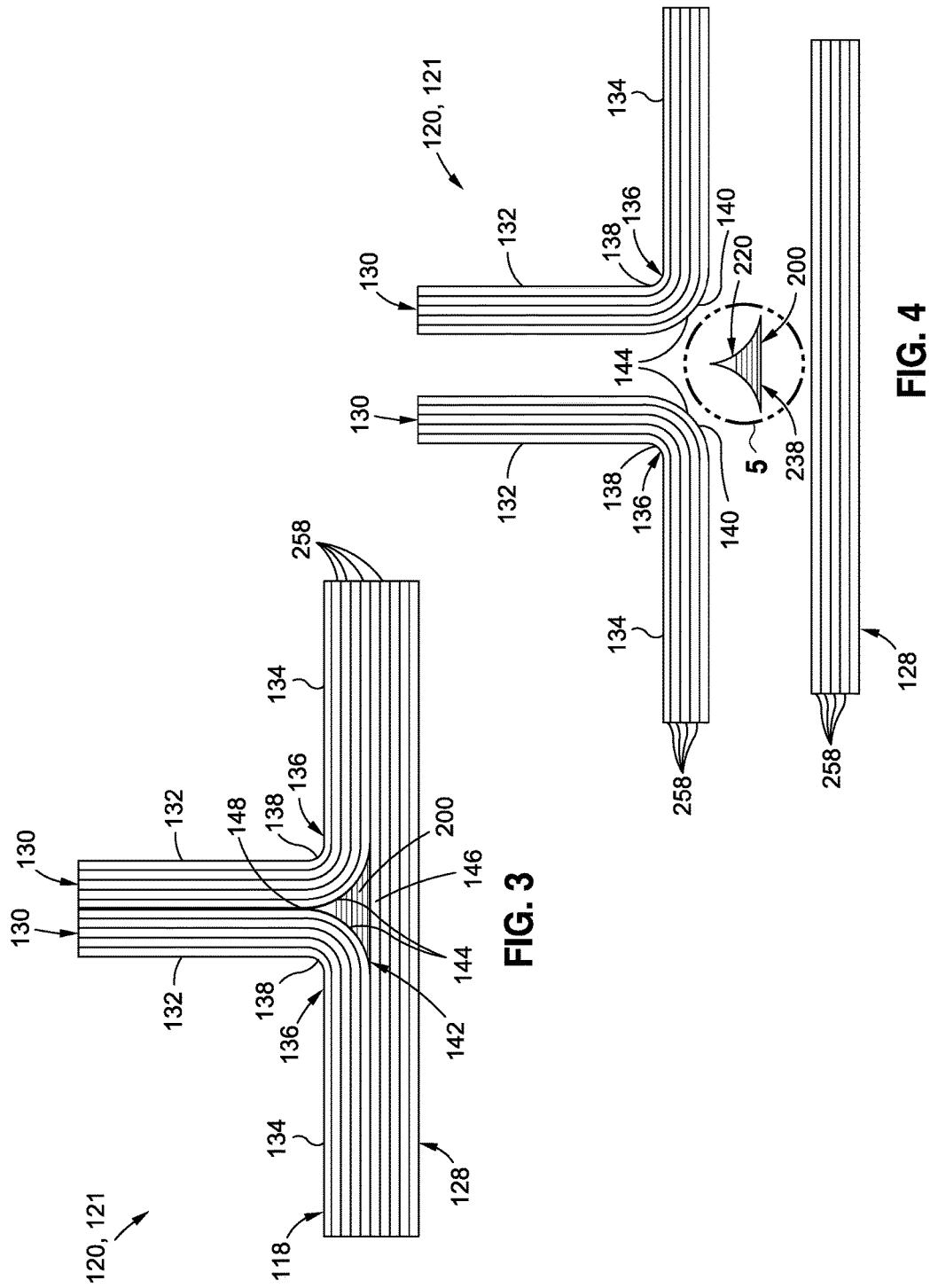

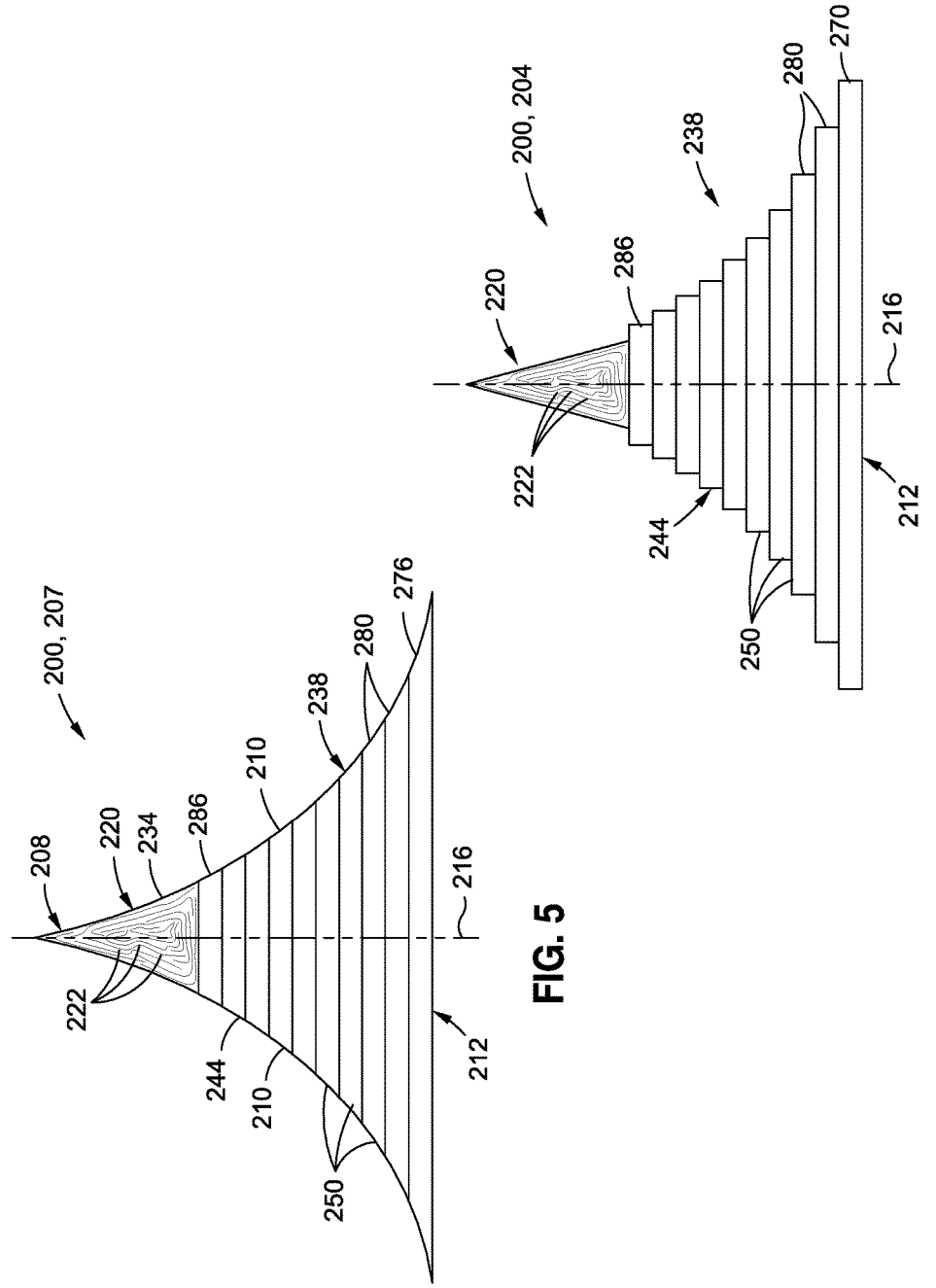

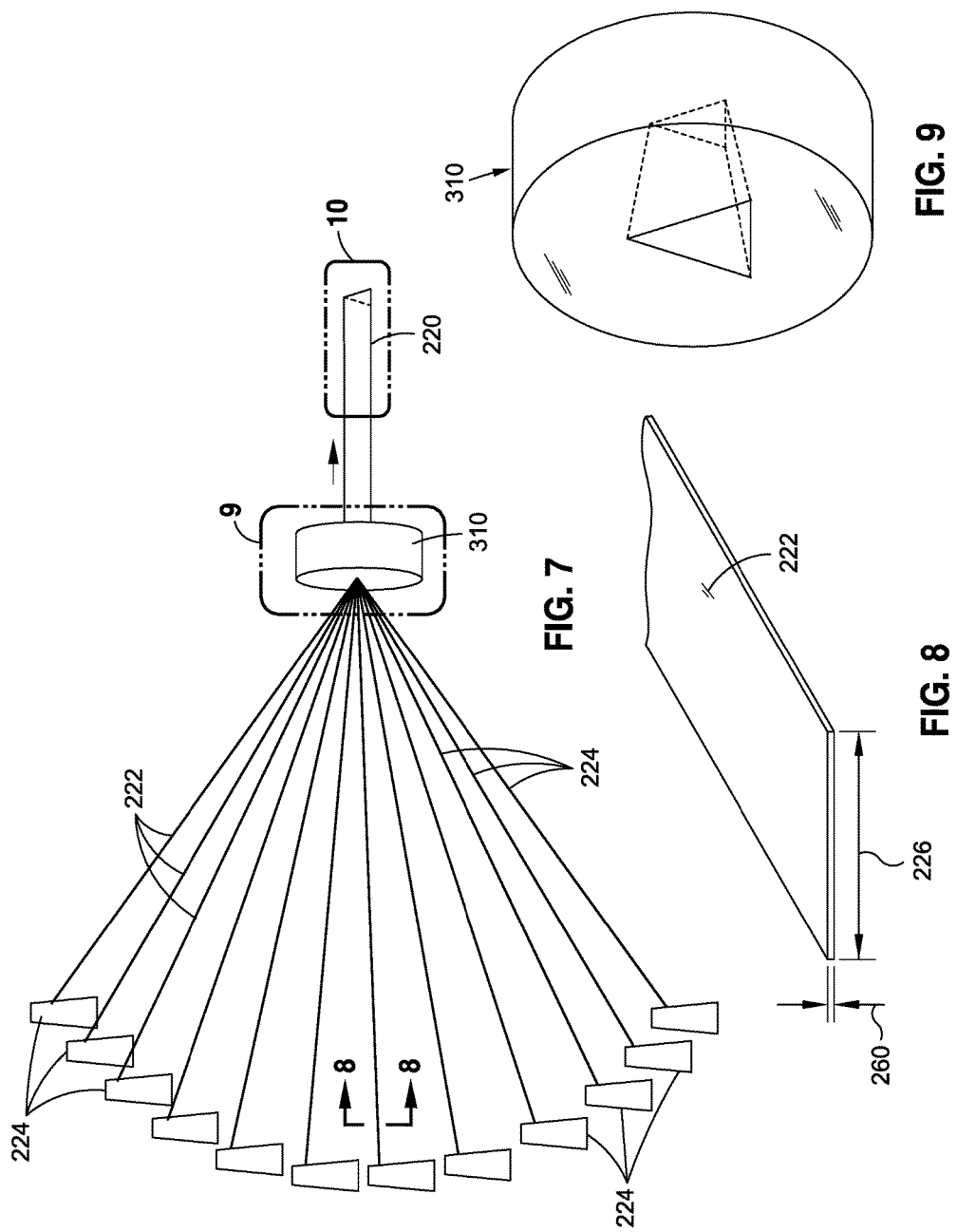

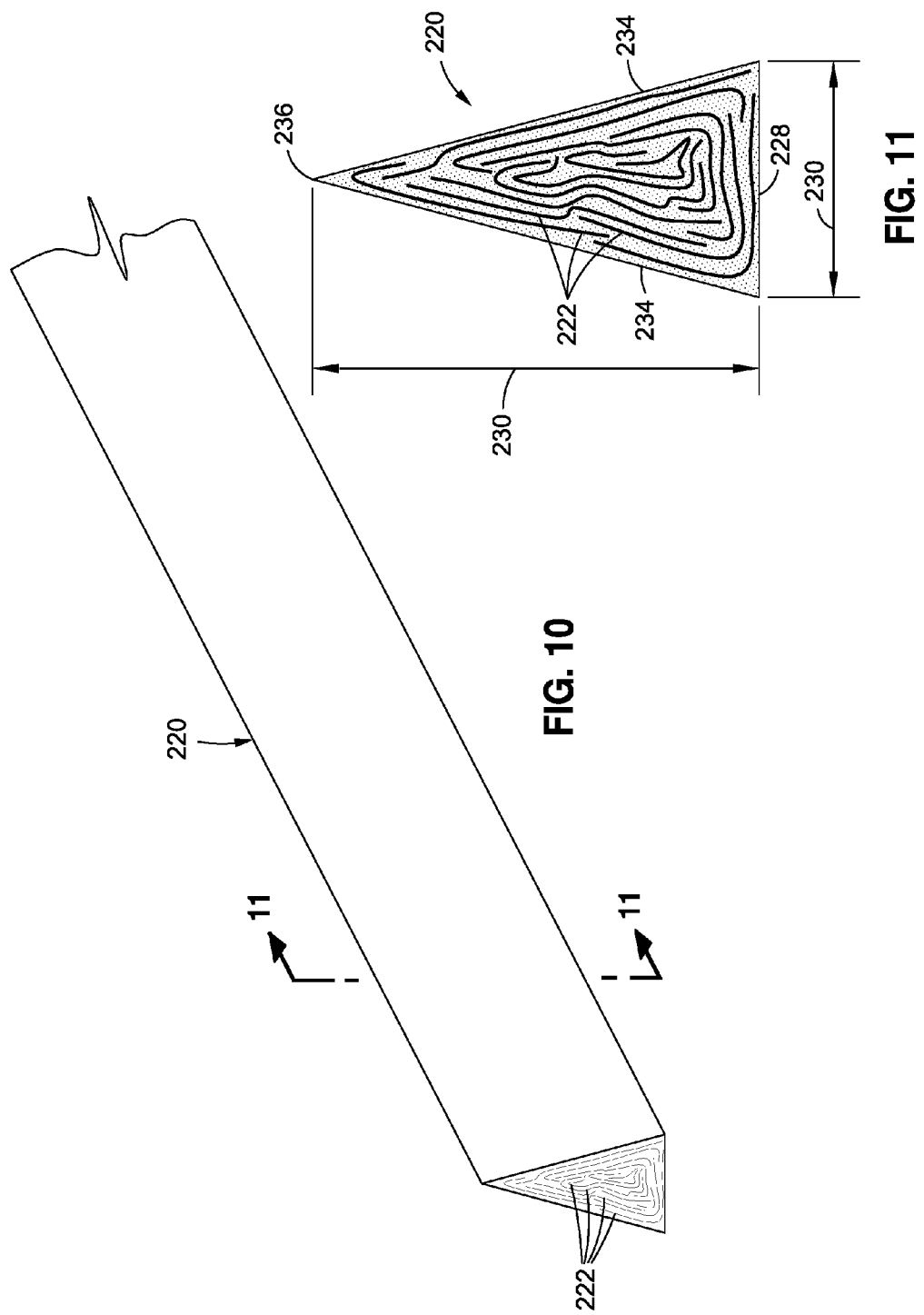

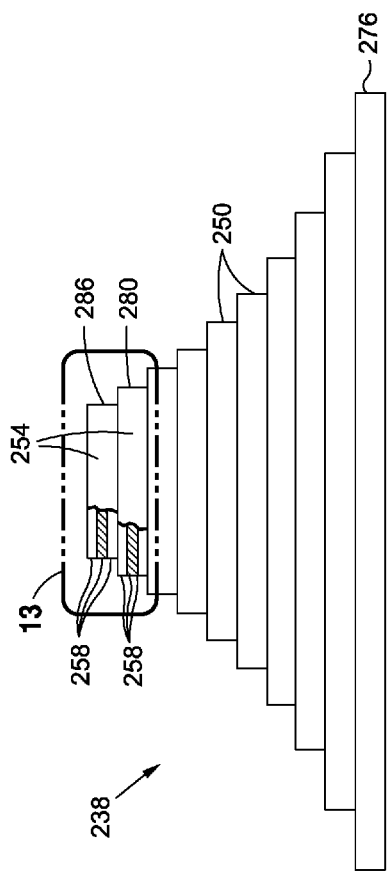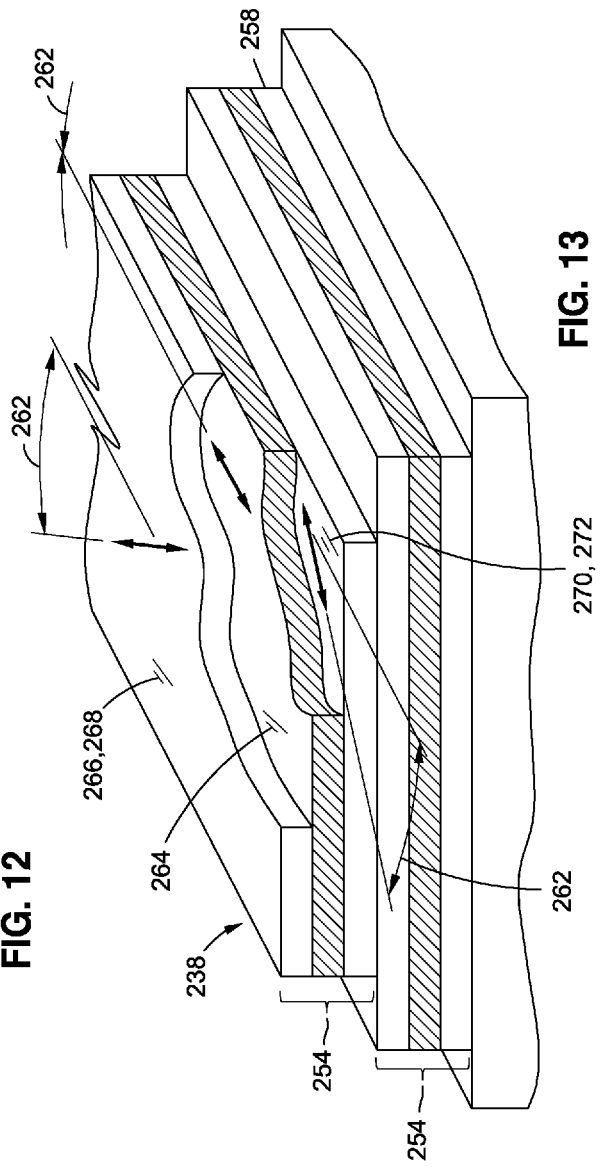

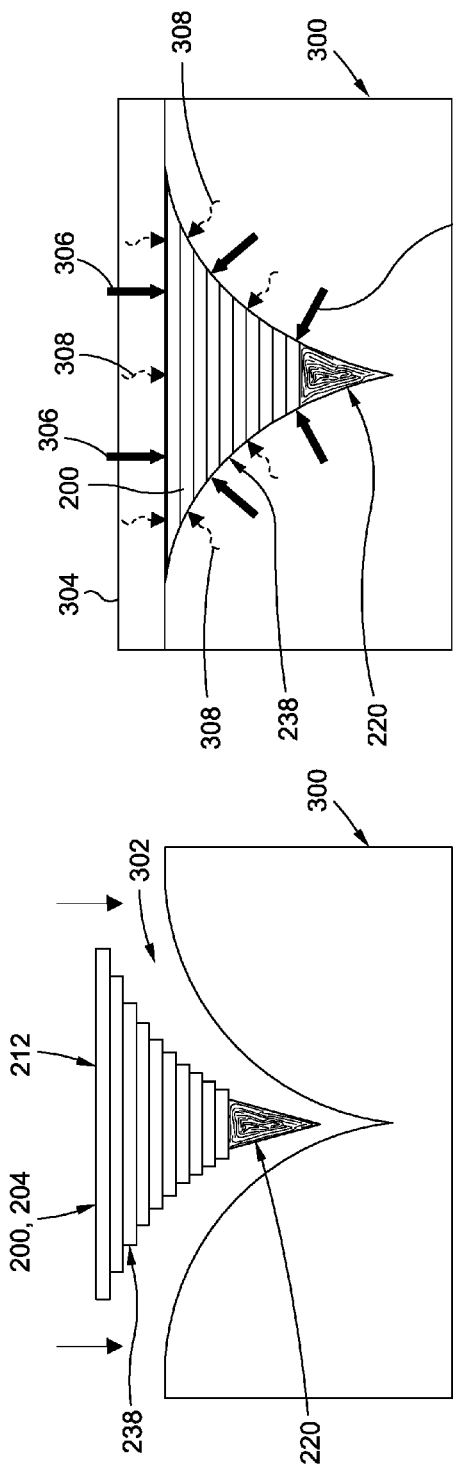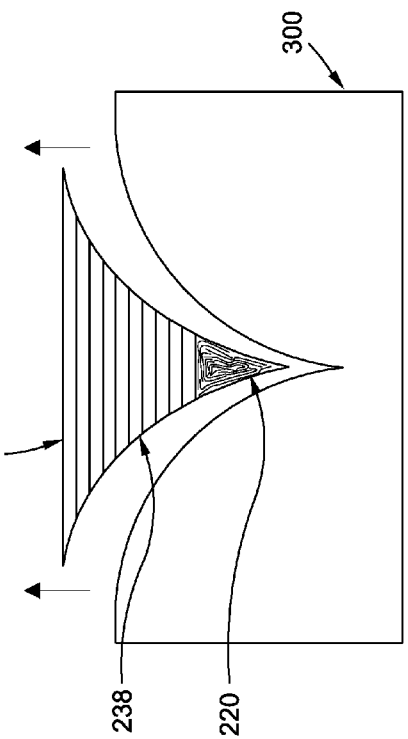

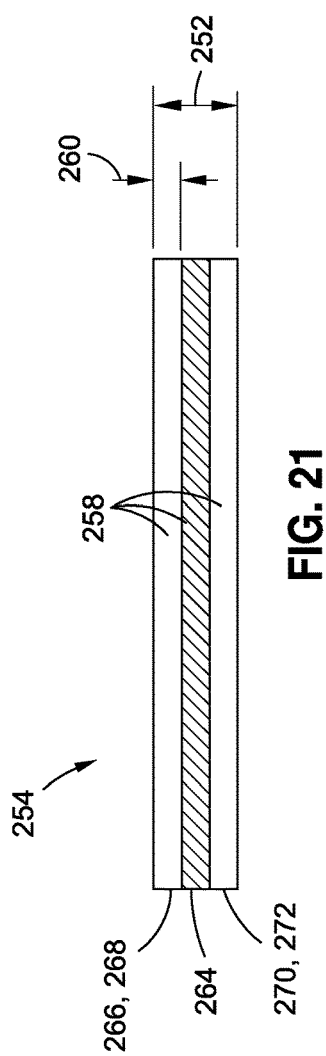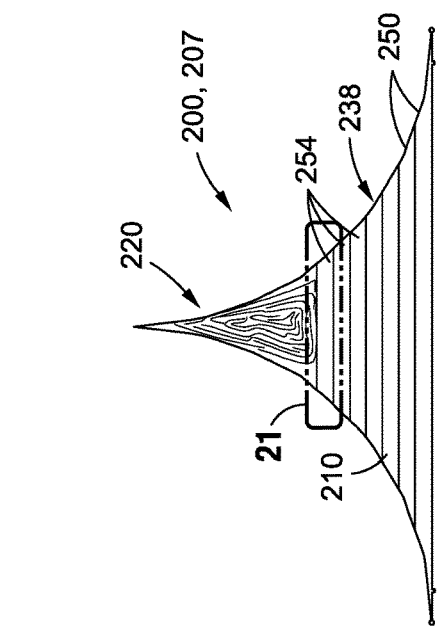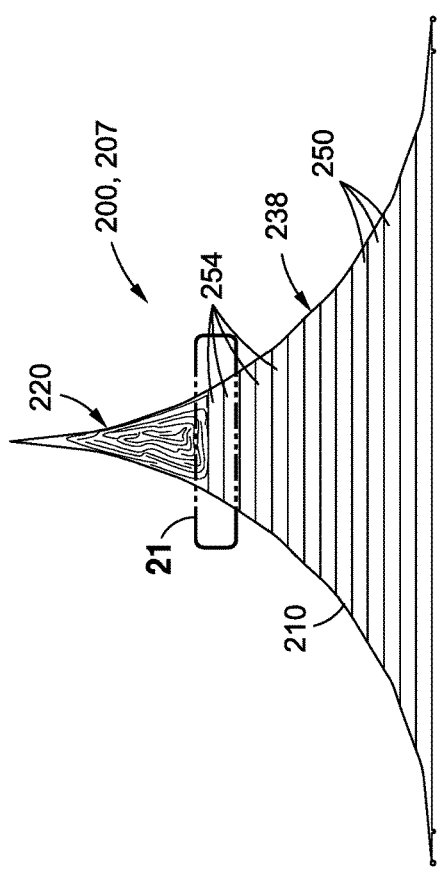

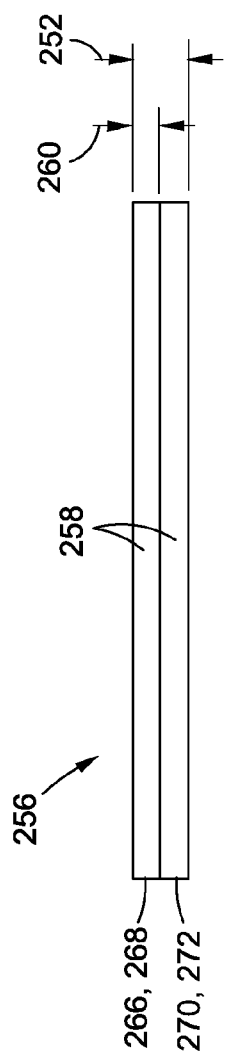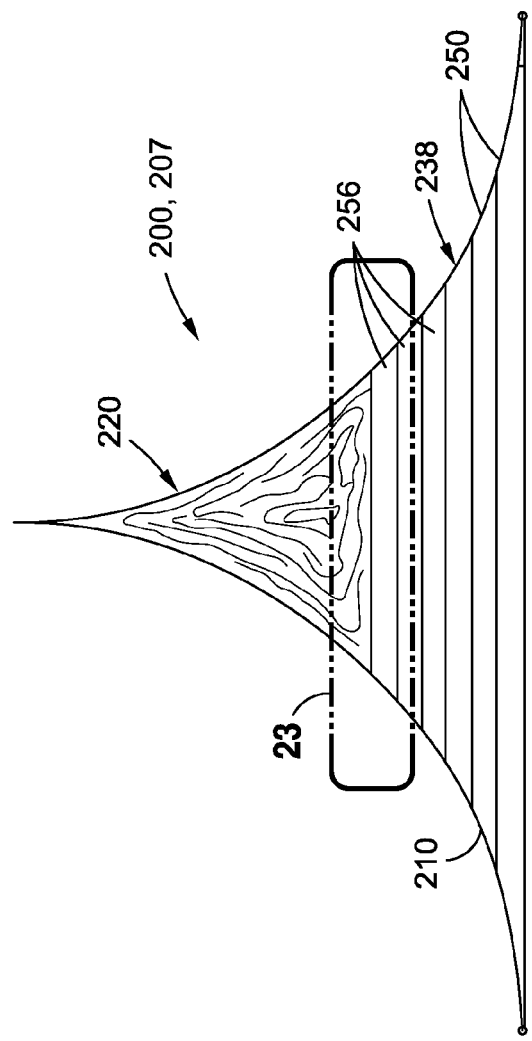

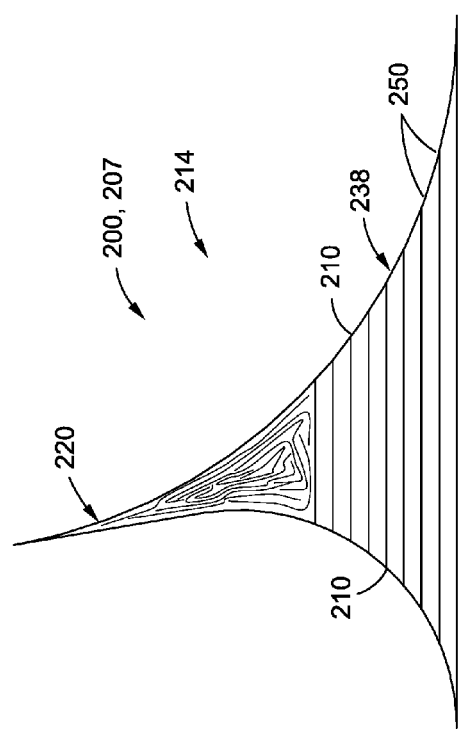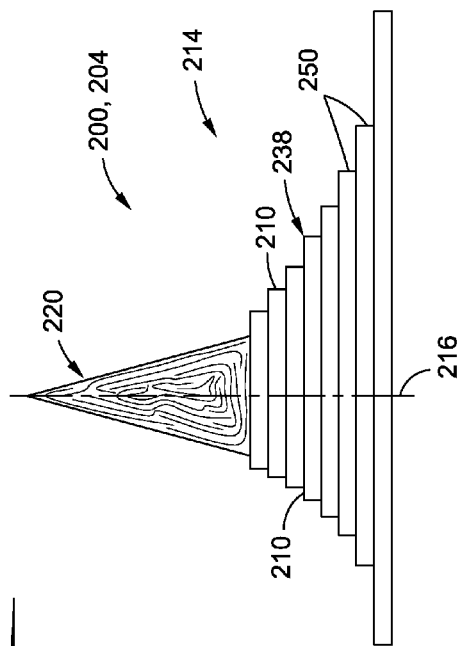

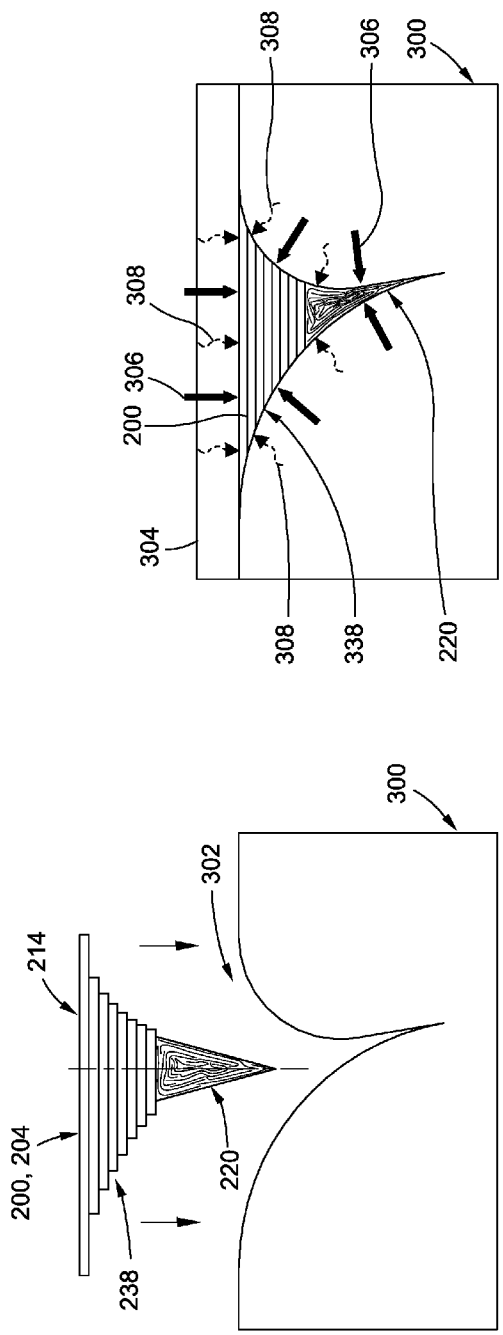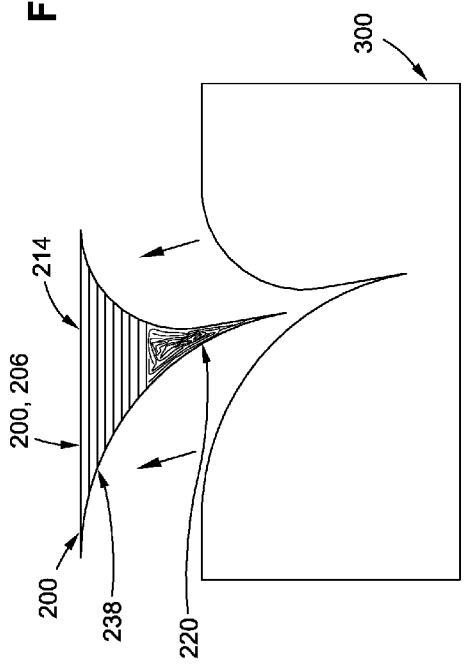

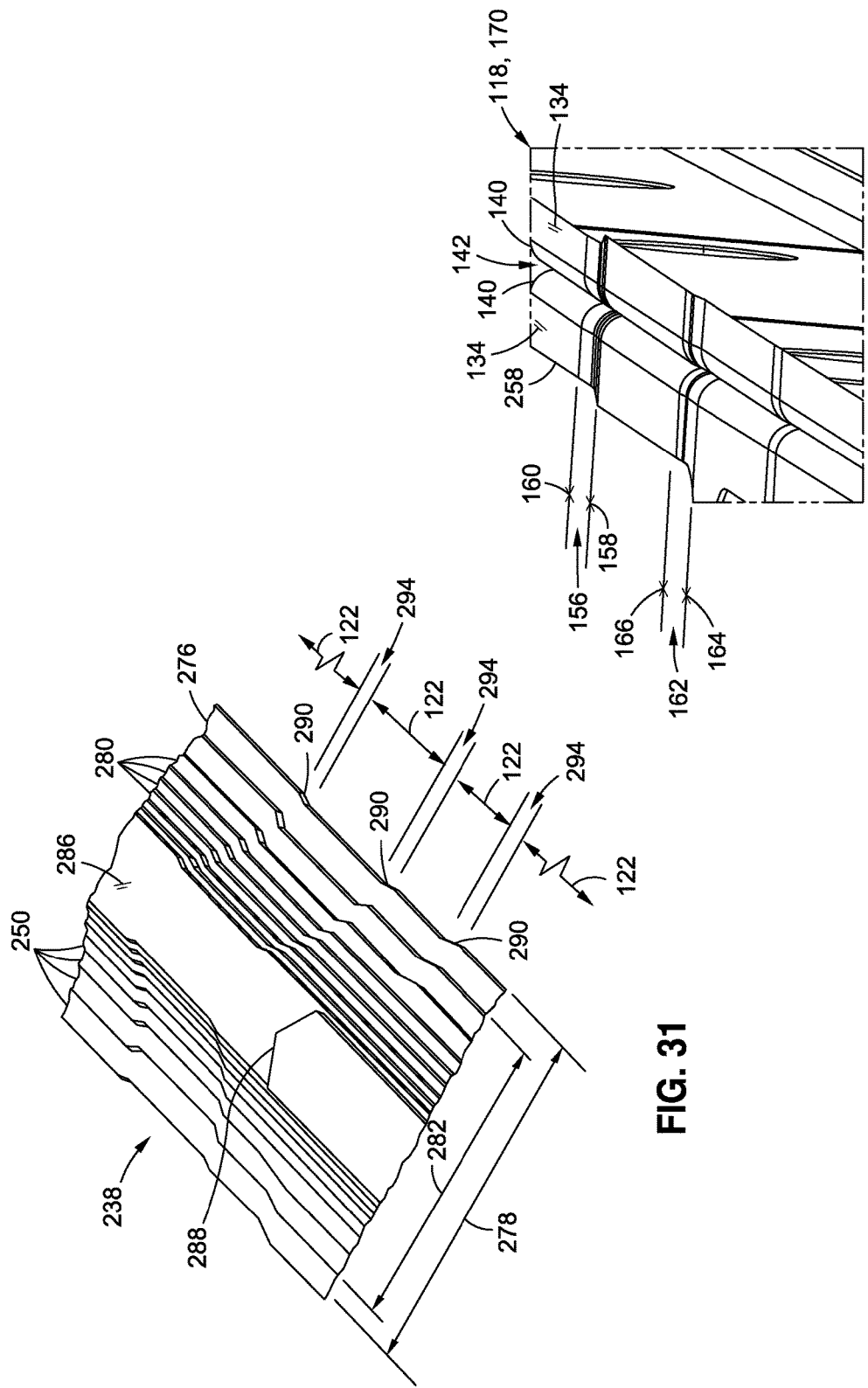

ADVANCED VARIABLE RADIUS LAMINATED COMPOSITE RADIUS FILLER

FIELD

The present disclosure relates generally to composite structures and, more particularly, to a composite radius filler for a composite structure.

BACKGROUND

Composite structures are used in a wide variety of applications due to their high strength-to-weight ratio, corrosion resistance, and other favorable properties. In aircraft construction, composites are used in increasing quantities to form the fuselage, wings, horizontal and vertical stabilizer, and other components. For example, the wing of an aircraft may be formed of composite skin panels co-cured or co-bonded to internal composite structures such as composite stringers and composite spars. The composite stringers and spars may extend along a spanwise direction from the wing root to the wing tip and may generally taper in thickness along the spanwise direction to gradually reduce the stiffness of the stringer or spar.

Composite stringers and spars may be provided in a variety of cross-sectional shapes. For example, a composite stringer may be formed in a hat-shaped cross section and referred to as a vent stringer or hat stringer. In another example, a composite stringer may be formed in a T-shaped cross section referred to as a blade stringer. A blade stringer may be formed by bonding together two L-shaped charges in back-to-back arrangement. Each one of the L-shaped charges may have a flange and a web interconnected by a radiused web-flange transition. When the webs of two L-shaped charges are joined back-to-back, a lengthwise notch or part cavity (e.g., a radius filler region) is formed between the opposing web-flange transitions. To improve the strength, stiffness, and durability of the stringer and the bond between the stringer and a skin panel, the part cavity is typically filled with a radius filler which may be referred to as a noodle and which is typically formed of composite material.

Composite radius fillers suffer from several drawbacks which detract from their overall utility. For example, certain radius fillers may exhibit reduced structural performance due to susceptibility to cracking which may correspond to a relatively low pull-off strength at the bond between the stringer and a skin panel to which the stringer is bonded. Furthermore, certain radius filler configurations have inside radii that vary along a lengthwise direction which may prevent non-destructive inspection (NDI) of the inside radii using acoustic inspection methods. In addition, certain radius filler configurations require the assembly of multiple components to form the radius filler, and which has an adverse impact on manufacturing cost and schedule. Furthermore, certain stringer configurations require a radius filler having an asymmetric shape which is difficult to manufacture using existing radius filler configurations.

As can be seen, there exists a need in the art for a radius filler that provides improved structural performance including reduced susceptibility to cracking, improved ability to tailor the stiffness characteristics, and improved pull-off strength. Furthermore, there exists a need in the art for a radius filler that improves the inspectability of the composite structure containing the radius filler, and which can also be manufactured in a low-cost and timely manner.

SUMMARY

The above-noted needs associated with radius fillers for composite structures are specifically addressed and alleviated by the present disclosure which provides a composite radius filler including a base portion and a tip portion. The base portion is formed of composite plies varying in overall width along an overall lengthwise direction and defining a variable cross-sectional shape of the base portion along the lengthwise direction. The base portion includes at least one transition zone having a transition start and a transition end along the lengthwise direction. The composite plies of the base portion are arranged in one or more stacks each having a predetermined fiber orientation angle sequence and a stack width that changes within the transition zone. The tip portion includes a plurality of composite plies formed into a generally triangular cross-sectional shape and stacked on top of the base portion.

Also disclosed is a composite structure including a pair of composite charges in back-to-back contact with one another and forming a lengthwise part cavity. In addition, the composite structure includes a radius filler installed in the part cavity. The radius filler is made up of a base portion and a tip portion. The base portion is formed of composite plies varying in overall width along an overall lengthwise direction and defining a variable cross-sectional shape of the base portion along the lengthwise direction. The base portion includes at least one transition zone. The composite plies of the base portion are arranged in one or more stacks each having a predetermined fiber orientation angle sequence and a stack width that changes within the transition zone. The tip portion includes a plurality of composite plies formed into a generally triangular cross-sectional shape and stacked on top of the base portion.

Also disclosed is a method of manufacturing a radius filler. The method includes providing a base portion formed of composite plies varying in overall width along at least a portion of an overall lengthwise direction and defining a variable cross-sectional shape of the base portion along the lengthwise direction. The base portion including at least one transition zone. The composite plies of the base portion are arranged in one or more stacks of composite plies having a predetermined fiber orientation angle sequence and having a stack width. The stack width of at least one of the stacks changes within the transition zone. The method may additionally include providing a tip portion having a generally triangular cross-sectional shape, and assembling the tip portion with the base portion to form a radius filler in an as-stacked condition. The method may additionally include applying heat and/or pressure to the radius filler to produce a radius filler having a variable cross-sectional shape.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a diagrammatic representation of a sectional view of a composite stringer (e.g., blade stringer) taken along line 3 of FIG. 2;

FIG. 4 is a diagrammatic representation of an exploded sectional view of a composite stringer of FIG. 3 and illustrating a pair of L-shaped charges, a base charge, and a radius filler;

FIG. 5 is a diagrammatic representation of a sectional view of the radius filler of FIG. 4 in an as-formed condition and which may be assembled with the stringer of FIG. 4;

FIG. 6 is a diagrammatic representation of a sectional view of the radius filler of FIG. 5 in an as-stacked condition and illustrating a base portion and a tip portion;

FIG. 7 is a diagrammatic representation of a perspective view of a plurality of unidirectional slit tape tows passing through a pultrusion die;

FIG. 8 is a diagrammatic representation of a perspective view of a lengthwise section of a unidirectional slit tape tow;

FIG. 9 is a perspective view of the pultrusion die of FIG. 7;

FIG. 10 is a diagrammatic representation of a perspective view of a lengthwise section of a tip portion having a triangular cross-sectional shape;

FIG. 11 is a diagrammatic representation of a sectional view of the tip portion taken along line 11 of FIG. 10 and illustrating the non-planar cross-sectional shape of the slit tape tows as a result of being pultruded through the pultrusion die of FIG. 9;

FIG. 12 is a diagrammatic representation of a sectional view of an example of a base portion of a radius filler in an as-stacked condition and being assembled of a plurality of three-ply stacks wherein each stack contains three composite plies;

FIG. 13 is a diagrammatic representation of a perspective view of the top two stacks of the base portion of FIG. 12 and illustrating each three-ply stack being having a +non-zero degree ply, a −non-zero degree ply, and a zero degree ply in between the +non-zero degree ply and the −non-zero degree ply;

FIG. 15 is a diagrammatic representation of a sectional view of a radius filler in an as-stacked condition prior to installation into a forming die;

FIG. 16 is a diagrammatic representation of a sectional view of the application of heat and pressure to the radius filler within the forming die;

FIG. 17 is a diagrammatic representation of a sectional view of the radius filler in the as-formed condition after removal from the forming die;

FIG. 19 is a diagrammatic representation of a sectional view of a radius filler taken along line 19 of FIG. 18 and illustrating the radius filler in as-formed condition and which may be installed in a heavy-gauge section in the acreage of the stringer of FIG. 18;

FIG. 20 is a diagrammatic representation of a sectional view of a radius filler in as-formed condition for a light-gauge section of a stringer (not shown);

FIG. 21 is a diagrammatic representation of a sectional view of the uppermost three-ply stack of the base portion of FIGS. 19 and 20 and illustrating the three composite plies that make up the three-ply stack;

FIG. 22 is a diagrammatic representation of a sectional view of a radius filler taken along line 22 of FIG. 18 and illustrating the radius filler in as-formed condition and which may be installed in the runout of the stringer of FIG. 18;

FIG. 23 is a diagrammatic representation of a sectional view of the uppermost two-ply stack of the base portion of FIG. 22 and illustrating the two composite plies that make up the two-ply stack;

FIG. 26 is a diagrammatic representation of a sectional view of a radius filler taken along section 26 of FIG. 27 and illustrating the radius filler having an asymmetric shape in an as-formed condition;

FIG. 27 is a diagrammatic representation of a sectional view of a radius filler in an as-stacked condition having an asymmetric shape and which may be formed into the asymmetric shape of the radius filler of FIG. 26 in an as-formed condition for installation into a part cavity resulting in the radius filler having an asymmetric shape in the as-assembled condition;

FIG. 28 is a diagrammatic representation of a sectional view of a radius filler having an asymmetric shape in the as-stacked condition prior to installation into an asymmetrically-shaped forming die;

FIG. 29 is a diagrammatic representation of a sectional view of the application of heat and pressure to the radius filler within the forming die;

FIG. 30 is a diagrammatic representation of a sectional view of the radius filler having an asymmetric shape in an as-formed condition after removal from the forming die;

FIG. 31 is a diagrammatic representation of a perspective view of a lengthwise section of a base portion of a radius filler illustrating the variable cross-sectional shape of the base portion and further illustrating a stack termination of one of the stacks in the base portion;

FIG. 32 is a diagrammatic representation of a perspective view of an example of a lengthwise section of a composite spar having a lengthwise part cavity into which a radius filler is to be installed and further illustrating localized ply additions and ply drops in the stringer corresponding to the transition zones in the base portion of the radius filler;

DETAILED DESCRIPTION

Figure 1:
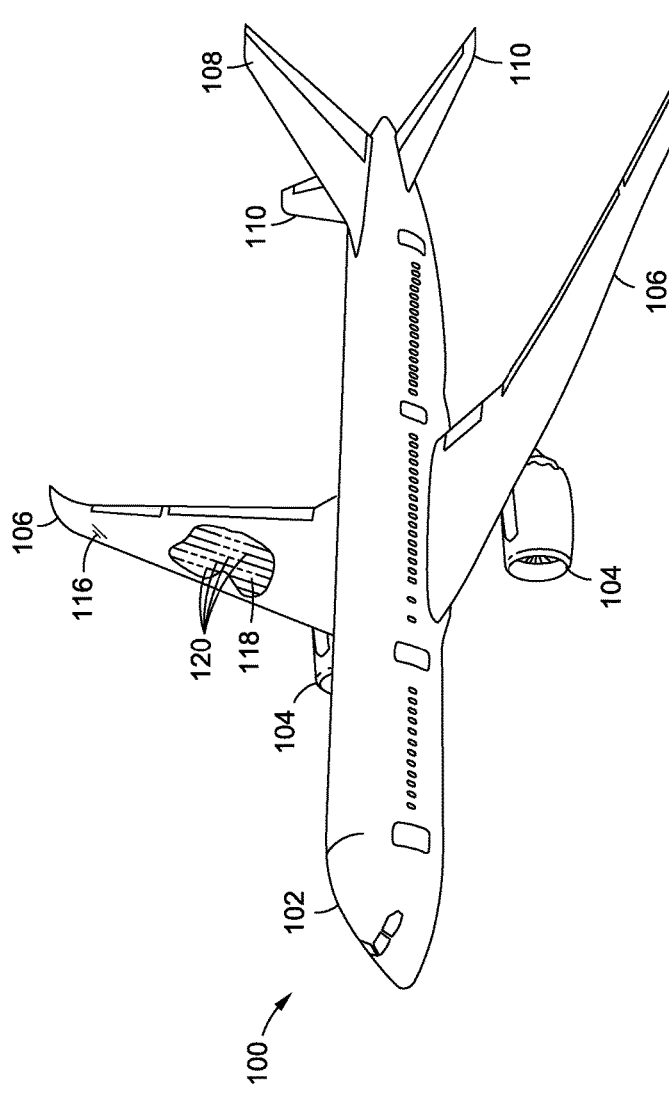
FIG. 1 is a diagrammatic representation of a perspective view of an aircraft comprised of one or more composite structures incorporating one or more composite radius fillers as disclosed herein.

Referring now to the drawings wherein the showings are for purposes of illustrating preferred and various embodiments of the disclosure, shown in FIG. 1 is an aircraft 100 having a fuselage 102 extending from a forward end to an aft end of the aircraft 100. The aft end may include one or more tail surfaces for directional control of the aircraft 100 such as a vertical stabilizer 108 and a pair of horizontal stabilizers 110. The aircraft 100 may further include a pair of wings 106 extending outwardly from the fuselage 102 and one or more propulsion units 104. The fuselage 102, the wings 106, the vertical stabilizer 108, the horizontal stabilizers 110, and other aircraft components may be formed as composite structures 118, one or more of which may incorporate one or more composite radius fillers 200 (FIG. 3) as disclosed herein. For example, as shown in FIG. 1, the wings 106 of an aircraft 100 may be include a plurality of internal composite stringers 120 and composite spars 170 (e.g., FIG. 32), each of which include one or more radius fillers 200 and which may be co-cured or co-bonded to a skin panel 116. The stringers 120 and spars 170 may be oriented along a spanwise direction of each wing 106 and may generally taper in thickness or gauge along the spanwise direction as a means to gradually reduce the stiffness of the stringer 120.

Figure 2:
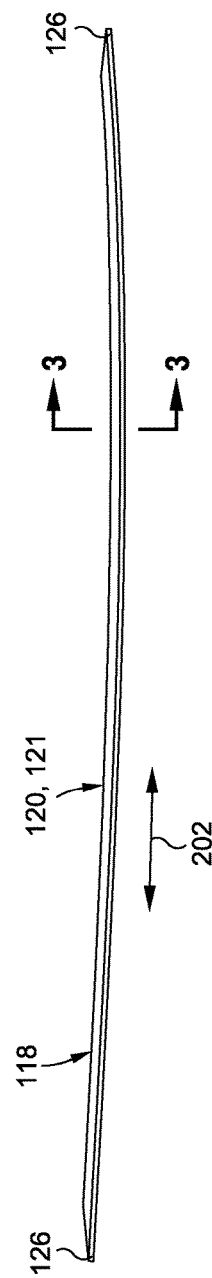
FIG. 2 is a diagrammatic representation of a side view of an example of a composite stringer configured as a blade stringer and having a radius filler as disclosed herein.

FIG. 2 is a side view of a composite stringer 120 incorporating a radius filler 200 (FIG. 3) as disclosed herein. In the example shown, the stringer 120 is configured as a blade stringer 121 (FIG. 3). As described in greater detail below, the stringer gauge may generally vary (e.g., decrease) along a lengthwise direction 202 of the stringer 120. In addition, the stringer gauge may be reduced at the stringer ends 126 (e.g., at the runouts 124—FIG. 18) to reduce the stringer 120 stiffness and thereby avoid stress concentrations at the stringer ends 126.

FIG. 3 is a sectional view of an example of a stringer 120 (i.e., a blade stringer 121) having a T-shaped cross section. FIG. 4 is an exploded view of the stringer 120 of FIG. 3. FIGS. 3-4 illustrate a pair of L-shaped charges 130, a base charge 128, and a radius filler 200 that make up the stringer 120. The L-shaped charges 130 and the base charge 128 are each formed as a laminate of composite plies 258. Each one of the L-shaped charges 130 includes a flange 134 and a web 132 interconnected by a web-flange transition 136. The web-flange transitions 136 have an inside radius 138 and an outside radius 140. In a blade stringer 121, the webs 132 may be oriented relative to the flanges 134 at a web angle 218 ranging from 90° down to 75° or less. In a blade stringer 121, the web angle 218 may vary along the lengthwise direction of the stringer 121. However, in some examples, the web angle 218 of a blade stringer 121 may be constant along the lengthwise direction of the stringer 121.

The webs 132 of the L-shaped charges 130 may be placed in back-to-back contact with one another resulting in a lengthwise part cavity 142 (e.g., a radius filler region) between the opposing web-flange transitions 136 of the L-shaped charges 130. The radius filler 200 is sized and configured to fill the part cavity 142 when the base charge 128 is assembled to the L-shaped charges 130. After assembly, the L-shaped charges 130, the radius filler 200, and the base charge 128 may be co-bonded or co-cured to a skin panel 116 (FIG. 1). In an alternative embodiment not shown, the base charge 128 may be omitted, and the L-shaped charges 130 and radius filler 200 may be assembled directly onto a skin panel 116 for co-bonding or co-curing.

Figure 24:
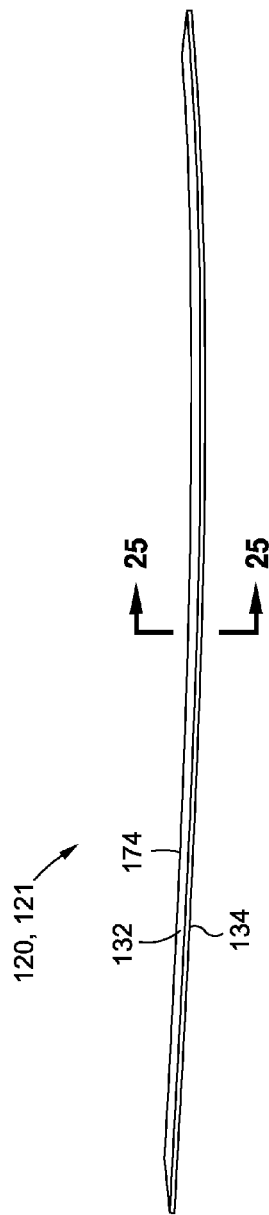
FIG. 24 is a diagrammatic representation of a side view of a composite stringer configured as a hat stringer.
Figure 25:
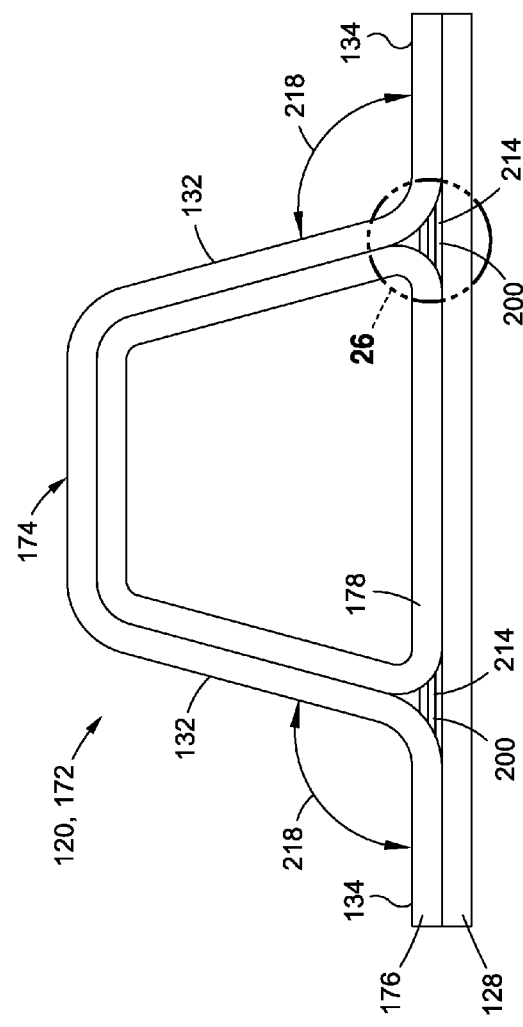
FIG. 25 is a diagrammatic representation of a sectional view of the stringer taken along line 25 of FIG. 24 and illustrating a pair of asymmetric radius fillers installed in the hat stringer.

Although the radius filler 200 of the present disclosure is initially described in the context of a blade stringer 121 (FIGS. 3-4), the radius filler 200 may be incorporated into any one a variety of different stringer and spar configurations, and is not limited to a blade stringer 121. For example, as described below, radius fillers 200 having an asymmetric shape 214 (FIG. 26) may be incorporated into a stringer 120 having a hat-shaped cross section and which may be referred to as a hat stringer 172 (FIGS. 24-25). In addition, the radius filler 200 may be incorporated into a composite structure 118 such as a composite spar 170 (FIG. 32) having an I-beam cross-section (not shown). However, the presently-disclosed radius filler 200 may be incorporated into any one a variety of different composite structure configurations, and is not limited to incorporation into a composite stringer 120 or a composite spar 170.

FIG. 5 is a sectional view of the composite radius filler 200 of FIG. 4 in an as-formed condition 206 (e.g., FIGS. 17 and 30). The radius filler 200 in the as-formed condition 206 is an intermediate shape between the as-stacked condition (e.g., FIGS. 6 and 27) and the as-assembled condition 207 (e.g., FIGS. 3 and 25). The radius filler 200 in the as-formed condition 206 is configured to be installed within a part cavity 142 of a composite structure 118. For example, a radius filler 200 in an as-formed condition 206 may be installed within a part cavity 142 between the back-to-back L-shaped charges 130 (FIGS. 3-4) of a blade stringer 121. The part cavity 142 has opposing cavity sides 144 (FIGS. 3-4) defined by the corresponding opposing outside radii 140 (FIG. 4) of the web-flange transitions 136.

The radius filler sides 210 may have a variable radius along a lengthwise direction 202 of at least a portion of the radius filler 200 to accommodate variable outside radii 140 of the part cavity 142 along the lengthwise direction 202. In the as-formed condition 206, the opposing radius filler sides 210 are preferably contoured complementary to the cavity sides 144. When the radius filler 200 in the as-formed condition 206 is installed in the part cavity 142, the radius filler 200 assumes the as-assembled condition 207 (e.g., FIGS. 3 and 25) wherein the radius filler sides 210 conform to the outside radii 140 of the part cavity sides 144. The contour (e.g., the radii) of the radius filler sides 210 in the as-assembled condition 207 may be slightly different (e.g., different radii) than the contour (e.g., the radii) of the radius filler sides 210 in the as-formed condition 206.

Figure 18:
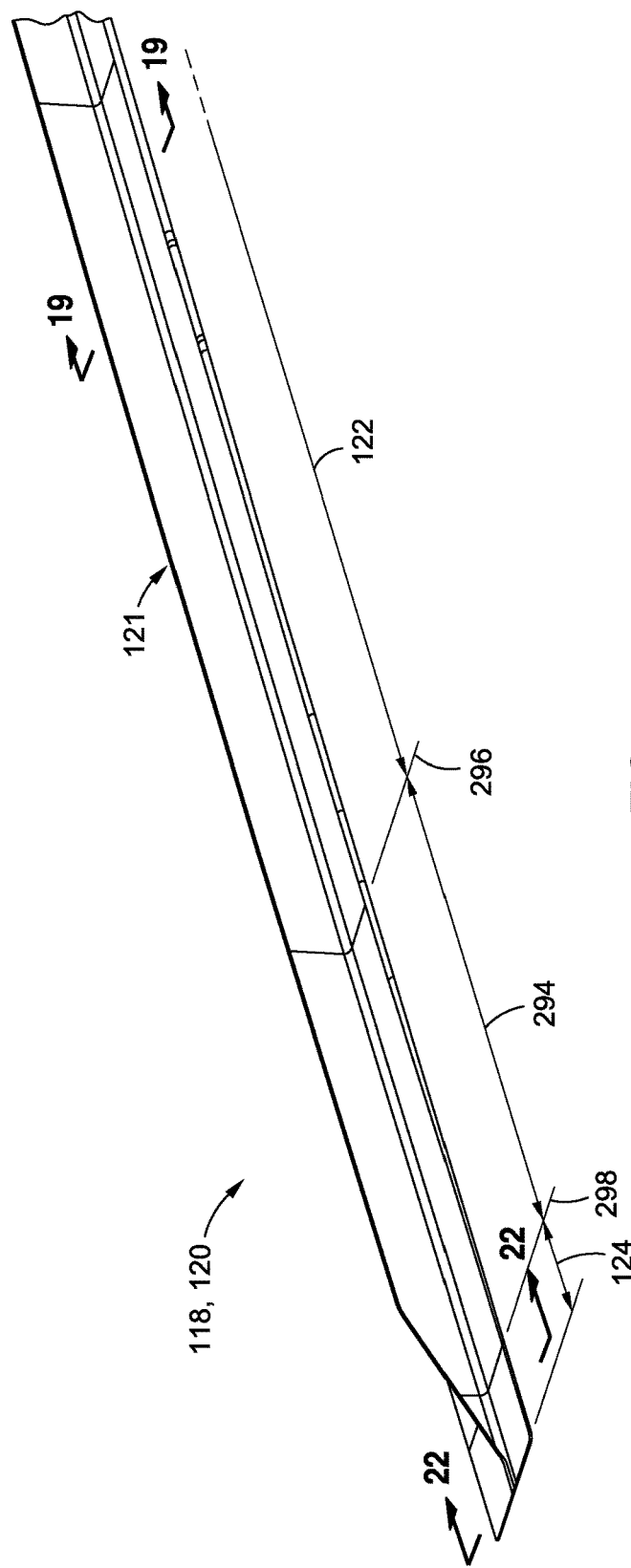
FIG. 18 is a diagrammatic representation of a perspective view of a lengthwise section of a blade stringer having a constant-gauge acreage interconnected by a varying-gauge transition zone to a constant-gauge runout at an end of the stringer.

FIG. 6 is a sectional view of the radius filler 200 of FIG. 5 in an as-stacked condition 204 prior to forming into the as-formed condition 206. The radius filler 200 includes a base portion 238 and a tip portion 220 positioned on top of the base portion 238. The base portion 238 is formed of composite plies 258 that vary in overall width along the lengthwise direction 202 (FIG. 2) of the transition zone 294 (FIG. 18). In this regard, the base portion 238 has a variable cross-sectional shape within the transition zone 294. The transition zone 294 (FIG. 18) has a transition start 296 (FIG. 18) and a transition end 298 (FIG. 18) as described below.

As shown in FIGS. 5-6, the composite plies 258 of the base portion 238 are arranged in one or more stacks 250. Each stack 250 is formed as a laminated charge of composite plies 258 arranged in a predetermined fiber orientation angle 262 sequence, as shown in FIGS. 13, 21, and 23, and described below. The composite ply material may be a pre-impregnated fiber-reinforced polymer matrix material (i.e., prepreg) having a plurality of reinforcing fibers impregnated with thermosetting or thermoplastic matrix material or resin. In one example, the prepreg material may be an epoxy resin/carbon-fiber prepreg. The prepreg may be provided in a relatively small ply thickness (e.g., FIG. 21). For example, the prepreg may be provided in a standard ply thickness 260 of approximately 0.0076 inch, although the composite plies 258 used to form the presently-disclosed radius filler 200 may be provided in any thickness, without limitation. For example, prepreg plies may be provided in thicknesses as small as several thousands of an inch, as large as one or more ten thousands of an inch, or in any thickness in between.

In FIG. 6, each one of the stacks 250 in the base portion 238 has a stack width 278, 282 (e.g., FIG. 31) that is complementary to the width of the part cavity 142 (e.g., the part cavity in the composite spar 170 of FIG. 32) at the vertical location of the stack 250. As described below, the stack width 278, 282 of at least one of the stacks 250 in the base portion 238 changes or tapers within the transition zone 294 (FIG. 34) of the radius filler 200. However, in sections of the radius filler 200 outside of the transition zone 294, the stacks 250 have a constant stack width 278, 282. For example, the stack width 278, 282 are constant in the acreage 122 (FIG. 34) and the runout 124 (FIG. 34) of the radius filler 200, as described below.

In FIG. 6, the tip portion 220 is made up of a plurality of composite plies 258 formed into a generally triangular cross-sectional shape and stacked on top of the base portion 238. In one example, the composite plies 258 in the tip portion 220 are unidirectional slit tape tows 222. Unidirectional slit tape tows 222 may be formed by slitting sheets of prepreg composite ply material along a lengthwise direction to form a plurality of relatively narrow-width tows. For example, slit tape tow 222 may be provided in widths of ¼ inch, ½ inch, or any one a variety of different tow widths. The reinforcing fibers in each unidirectional slit tape tow 222 are oriented in a single direction which is parallel to the lengthwise direction of the slit tape tow 222. However, the tip portion 220 may be made up of other forms of tow, and is not limited to unidirectional slit tape tow 222.

FIG. 7 shows an example of a system for manufacturing the tip portion 220 of a radius filler 200. In the example shown, a plurality of unidirectional slit tape tows 222 are drawn from spools 224 and are passed through a pultrusion die 310. FIG. 8 illustrates a lengthwise section of a unidirectional slit tape tow 222 which may be drawn from a spool 224. The slit tape tow 222 has a relatively small ply thickness 260 (e.g., approximately 0.0076 inch) and may have a tow width 226 of between approximately 0.12 and 0.50 inch prior to pultruding with other slit tape tows 222 through the pultrusion die 310. In an embodiment, the tip portion 220 of the radius filler 200 may be comprised of anywhere from 4 to 9 slit tape tows 222 each having a tow width 226 of approximately 0.25 inch. However, a tip portion 220 may be fabricated with less than 4 tows or more than 9 tows. In addition, a tip portion 220 may be fabricated with slit tape tows 222 having a tow width 226 of other than 0.25 inch. Furthermore, a tip portion 220 may be fabricated with slit tape tows 222 in two or more different tow widths 226. FIG. 9 is a perspective view of an example of a pultrusion die 310 having a die opening through which the slit tape tows 222 are passed to conform and consolidate the slit tape tows 222 into a triangular cross-sectional shape.

FIG. 10 illustrates a lengthwise section of the tip portion 220 which may have a cross-sectional size and shape that is generally constant along the length of the tip portion 220. However, a tip portion 220 may be fabricated in a manner such that the tip portion 220 has a variable cross-sectional shape along one or more lengthwise sections of the tip portion 220. For example, one or more slit tape tows 222 may be added or dropped during the process of manufacturing (e.g., pultruding) a tip portion 220, resulting in the tip portion 220 having a variable cross-sectional size and/or shape along the lengthwise direction 202. In an embodiment, the tip portion 220 cross-sectional size and/or shape may be configured to vary in correspondence with the changing outside radii (FIG. 3-4) of the part cavity 142 (FIGS. 3-4) of a composite structure 118.

FIG. 11 is a sectional view of the tip portion 220 of FIG. 10 illustrating the non-planar cross-sectional shape of each slit tape tow 222 as a result of the slit tap tows 222 being smashed together during pultrusion through the pultrusion die 310. The tip portion 220 has a tip portion apex 236, opposing tip portion sides 234, and a tip portion bottom surface 228. The tip portion bottom surface 228 may be generally planar to facilitate the stacking of the tip portion 220 on top of the base portion 238. Advantageously, fabricating the tip portion 220 from unidirectional slit tape tows 222 improves manufacturability and structural performance of the radius filler 200 relative to radius filler 200 having tip portions 220 that include laminated composite plies 258.

FIG. 12 is a sectional view of an example of a base portion 238 of a radius filler 200 assembled from a plurality of three-ply stacks 254 each containing three composite plies 258. The base portion 238 has a stepped pyramidal cross-sectional shape made up of a bottom stack 276 and one or more mid stacks 280 assembled on top of the bottom stack 276. Depending upon the lengthwise location on the radius filler 200, the base portion 238 may include anywhere from 3 to 20 stacks 250 (e.g., including the bottom stack 276 and the mid stacks 280) of composite plies 258. However, a base portion 238 may include any number of stacks 250. The section of the base portion 238 containing three-ply stacks 254 is located in the acreage 122 (FIG. 18) of the radius filler 200. As described below, in a runout 124 of the radius filler 200, the base portion 238 includes a plurality of two-ply stacks 256 due to the ply termination 274 of the 0 degree plies 264 within the transition zone 294 interconnecting the acreage 122 to the runout 124.

FIG. 13 is a perspective view of the top two three-ply stacks 254 of the base portion 238 of FIG. 12 wherein each three-ply stack 254 consists of a +non-zero degree ply 266, a −non-zero degree ply 270, and a 0 degree ply 264 located between the +non-zero degree ply 266 and the −non-zero degree ply 270. Each one of the composite plies 258 in the three-ply stack 254 is a unidirectional ply having reinforcing fibers oriented in a single direction. For arrangements wherein the composite plies 258 each have a thickness of approximately 0.0076 inch, each three-ply stack 254 has a stack thickness 252 of approximately 0.0228 inch. The absolute value of the fiber orientation angle 262 of the +non-zero degree ply 266 and the −non-zero degree ply 270 is equal, such that each three-ply stack 254 is a balanced layup to minimize residual thermal stresses during curing. The fiber orientation angle 262 of the +non-zero degree ply 266 and the −non-zero degree ply 270 is preferably less than 45 degrees. For example, in a preferred embodiment, the fiber orientation angle 262 sequence of each three-ply stack 254 consists of a +30 degree ply 268, a −30 degree ply 272, and a 0 degree ply 264 located between the +30 degree ply 268 and the −30 degree ply 272. Advantageously, by assembling the base portion 238 from three-ply stacks 254 instead of stacks 250 having four or more composite plies 258, the bending stiffness characteristics of the radius filler 200 along the lengthwise direction 202 can be more precisely controlled by adding or dropping stacks 250.

Figure 14:
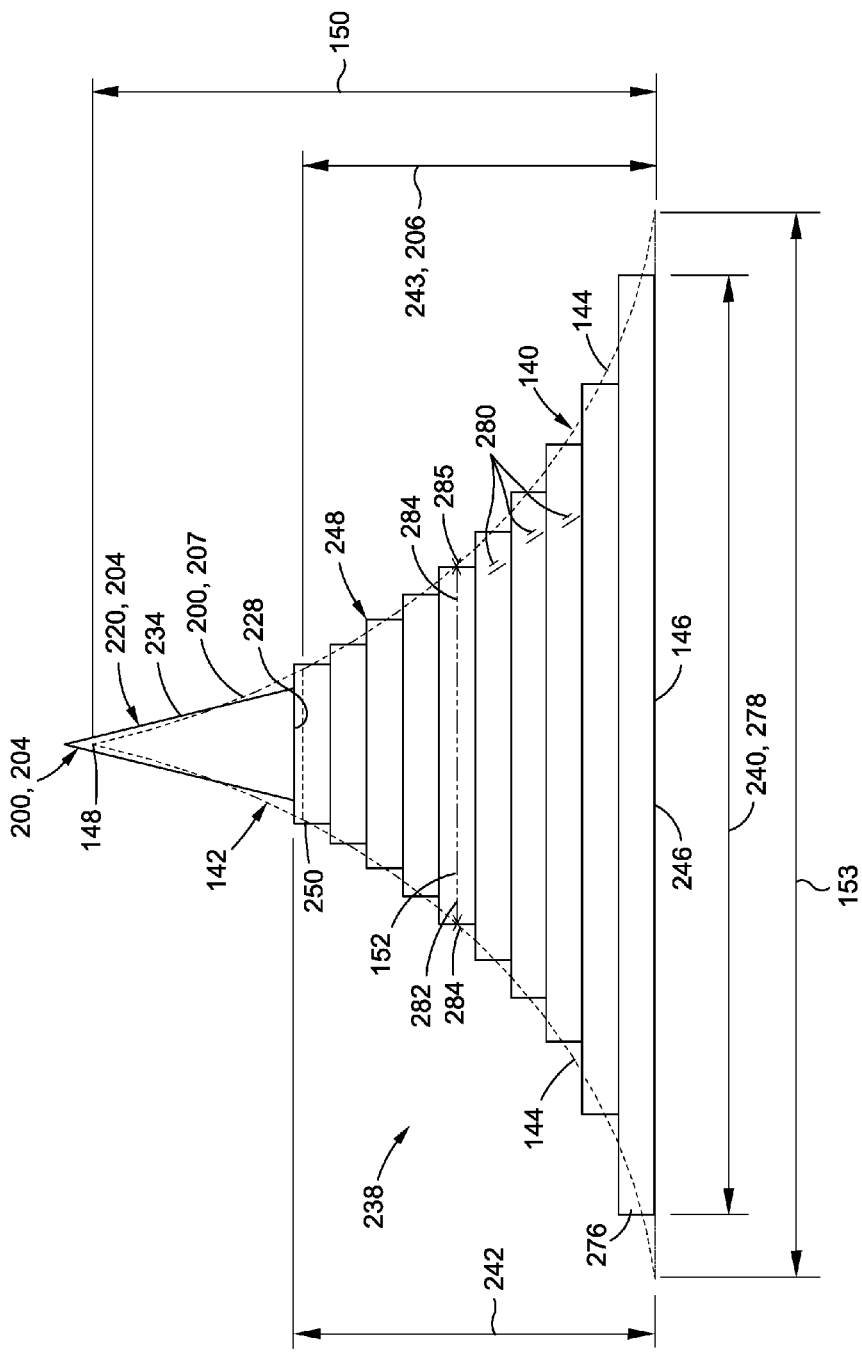
FIG. 14 is a diagrammatic representation of a sectional view of a radius filler in an as-stacked condition and further illustrating a vertical overfill of the radius filler relative to a cross-sectional profile of a part cavity into which the radius filler in an as-formed condition is to be installed.

FIG. 14 is a sectional view of a radius filler 200 in an as-stacked condition 204 (shown in solid lines) illustrating a vertical overfill 248 of the radius filler 200 relative to the cross-sectional profile of the part cavity 142 (shown in dashed lines) into which the radius filler 200 in the as-formed condition 206 (e.g., FIG. 17) is to be installed. The dashed lines in FIG. 14 represent the shape and size of the part cavity 142 as defined by the opposing cavity sides 144 which extend from the cavity base 146 to the cavity apex 148. The distance from the cavity base 146 to the cavity apex 148 defines the cavity height 150. As mentioned above, the opposing cavity sides 144 are defined by the opposing outside radii 140 of the back-to-back composite charges of the stringer 120, such as the back-to-back L-shaped charges 130 shown in FIGS. 3-4. The cavity base 146 is defined by the base charge 128 (FIG. 3-4) or skin panel 116 (FIG. 1) to which the stringer 120 is ultimately co-cured or co-bonded. As mentioned above, when the radius filler 200 in the as-formed condition 206 (e.g., FIGS. 17 and 30) is installed in the part cavity 142, the radius filler 200 assumes the as-assembled condition 207 (e.g., FIGS. 3 and 25) wherein the radius filler sides 210 conform to the outside radii 140 of the part cavity sides 144. The contour (e.g., the radii) of the radius filler sides 210 in the as-assembled condition 207 may be slightly different (e.g., different radii) than the contour (e.g., the radii) of the radius filler sides 210 in the as-formed condition 206.

In FIG. 14, the vertical overfill 248 may be provided by a radius filler 200 in the as-stacked condition 204 having a cross-sectional area that overfills the cross-sectional area of the part cavity 142. In this regard, the tip portion 220 has a tip portion bottom surface 228, and the base portion 238 has a base portion bottom surface 246 and a base portion height. The base portion 238 is designed to provide the radius filler 200 in the as-stacked condition 204 with a vertical overfill 248 of the part cavity 142 according to the following criteria: (1) the as-stacked base portion height 242 of the radius filler 200 in the as-stacked condition 204 is at least 5 percent greater than an as-assembled base portion height 243 of the radius filler 200 in the as-assembled condition 207 and, (2) the as-stacked base portion height 242 of the radius filler 200 in the as-stacked condition 204 is at least one additional ply thickness 260 (e.g., FIGS. 21 and 23) beyond the as-assembled base portion height 243. The as-stacked base portion height 242 extends from the base portion bottom surface 246 to the tip portion bottom surface 228 of the radius filler 200 in the as-stacked condition 204. The as-assembled base portion height 243 extends from the cavity base 146 to the location of the tip portion bottom surface 228 if the tip portion 220 were installed in the part cavity 142 such that the tip portion 220 is in the as-assembled condition 207.

The location of the tip portion bottom surface 228 when the radius filler 200 is in the as-assembled condition 207 may be determined by analysis or by measuring (e.g., physically, ultrasonically in a laboratory, etc.) the location of the tip portion bottom surface 228 relative to the cavity base 146 with the tip portion in the part cavity 142 and conformed to the part cavity sides 144 in the as-assembled condition 207. The location of the tip portion bottom surface 228 is such that the cross-sectional area of the tip portion 220 in the as-assembled condition 207 is equal to the cross-sectional area of the tip portion 220 in the as-stacked condition 204. The width of the one or more composite plies 258 added to meet the above-described vertical overfill 248 criteria may be substantially equivalent (e.g., within ±0.010 inch) to the part cavity width 152 at the intersection 285 of the cavity sides 144 with a mid-plane 284 of the additional composite plies 258. The one or more additional composite plies 258 for vertical overfill 248 may be added on top of the mid-stacks 280 of the base portion 238 in the as-stacked condition 204.

In the example of FIG. 14, the one or more composite plies 258 added to meet the vertical overfill 248 criteria comprises three additional composite plies 258 (e.g., a three-ply stack 254) added to meet the vertical overfill 248 criteria. However, in other examples, the addition of one or more composite plies 258 for vertical overfill 248 may either be a single composite ply 258, two composite plies 258, or more than three composite plies 258 added to meet the above-described vertical overfill 248 requirements at any lengthwise section of a stringer 120. In one example, the vertical overfill 248 criteria may be met by adding at least one three-ply stack 254 (as described above), such as in the acreage 122 of a stringer 120. In the runout 124 of a stringer 120, the vertical overfill 248 criteria may be met by adding at least one two-ply stack 256 (as described below). Although the vertical overfill 248 is at least 5 percent as described above, the vertical overfill 248 is not necessarily constant along the length of the radius filler 200, and may vary with changes in the stringer gauge and/or with changes in the web angle 218 (FIGS. 25-27) between the webs 132 and flanges 134, as described below. In this regard, the tip portion 220 has a tip portion height 232, a tip portion width 230, and a tip portion side 234 shape that may change with changes in the stringer gauge and/or web angle 218, as described in greater detail below.

Referring still to FIG. 14, as mentioned above, the part cavity 142 has opposing cavity sides 144 respectively defined by the opposing outside radii 140 of the back-to-back composite charges (FIGS. 3-4). The base portion 238 consists of a single bottom stack 276 and a plurality of mid stacks 280 on top of the bottom stack 276. Each one of the mid stacks 280 has a mid stack width 282 which is set to the nominal width of the part cavity 142. In this regard, the base portion 238 in the as-stacked condition 204 may be designed with minimal or non-existent overfill in the horizontal direction. More specifically, the mid stack width 282 of each one of the mid stacks 280 of the base portion 238 in the as-stacked condition 204 is substantially equivalent (e.g., within ±0.010 inch) to the part cavity width 152 at the intersection 285 of the cavity sides 144 with a mid-plane 284 of the respective mid stack 280.

In addition, the bottom stack 276 has a bottom stack width 278 that is less than the part cavity width 152 at the part cavity 142 bottom surface. Preferably, the bottom stack width 278 is approximately 0.10 inch (±0.010 inch) less than the part cavity bottom width 153 which may be defined as the distance between the intersections or tangency of the cavity sides 144 with the base charge 128 (FIG. 3) or skin panel 116 to which the stringer 120 is co-bonded or co-cured. Advantageously, it has been discovered that designing the radius filler 200 to have a vertical overfill 248 and minimal or non-existent horizontal overfill significantly improves compaction of the radius filler 200 and reduces susceptibility to cracking in the radius filler 200, relative to the reduced amount of compaction provided by radius fillers that rely on horizontal overfill. The improved compaction and reduced crack susceptibility due to the use of vertical overfill 248 in the presently-disclosed radius filler 200 advantageously improves the structural performance of the stringer 120 such as improved pull-off capability.

FIG. 15 shows a radius filler 200 in an as-stacked condition 204 and inverted prior to installation into a die cavity 302 of a forming die 300 in a non-limiting example of a system for forming the as-stacked condition 204 of the radius filler 200 into an as-formed condition 206. In this regard, any one of a variety of systems (not shown) may be implemented for forming an as-stacked 204 radius filler 200 into an as-formed 206 radius filler 200. In FIG. 15, the die cavity 302 may substantially duplicate the size and shape of the part cavity 142 of the composite structure 118 into which the radius filler 200 is to be installed in the as-formed condition 206. Although not shown, the die cavity 302 may be contoured complementary to lengthwise variations in the opposing outside radii 140 (FIGS. 3-4) of the part cavity 142.

FIG. 16 shows the radius filler 200 installed in the forming die 300 and encapsulated by a pressure plate 304 mounted on top of the forming die 300. Also shown is the application of heat 308 and/or pressure 306 to the radius filler 200 within the forming die 300. The heat 308 and/or pressure 306 may be applied to the radius filler 200 in a predetermined heat-pressure cycle to debulk and/or consolidate the radius filler 200. The application of heat 308 may reduce the resin viscosity in the prepreg composite plies 258 and the slit tape tows 222 that make up the radius filler 200, allowing the composite material under pressure 306 to conform to the cross-sectional shape of the die cavity 302.

FIG. 17 shows the radius filler 200 in the as-formed condition 206 after removal from the forming die 300. When the radius filler 200 is inside the forming die 300, heat 308 may be applied in a manner avoiding full cure of the resin such that the radius filler 200 may be removed from the die cavity 302 in a partially-cured green state. The radius filler 200 in the as-formed condition 206 may be installed into the part cavity 142 of a composite structure 118 such that the radius filler 200 conforms to the contour of the part cavity side 144 and wherein the radius filler 200 is in an as-assembled condition 207 as described above, for final co-curing and/or co-bonding with the composite charges that make up the stringer 120.

FIG. 18 shows a lengthwise section of an example of a blade stringer 121 having a constant-gauge acreage 122 section connected by a varying-gauge transition zone 294 to a constant-gauge runout 124 at the stringer end 126 of the stringer 120. As mentioned above, the acreage 122 of the stringer 120 and radius filler 200 may be described as a constant gauge section that is not located at the runout 124. The transition zone 294 may be described as a section of the stringer 120 and radius filler 200 that is of varying gauge from one constant-gauge section to another constant-gauge section. The runout 124 may be described as a constant-gauge section of the stringer 120 and radius filler 200. A runout 124 may be located at one stringer end 126 or at both stringer ends 126. In the example of a stringer 120 of a wing skin, the radius filler 200 may include a runout 124 at the inboard end 112 (FIG. 38) of the stringer 120, at the outboard end 114 (FIG. 38) of the stringer 120, or at both the inboard end 112 and the outboard end 114 of the stringer 120. The thickness or gauge of the stringer 120 and the radius filler 200 in a runout 124 is relatively thin compared to the thickness in the constant-gauge acreage 122 sections of the radius filler 200.

FIG. 19 is a sectional view of the radius filler 200 in the as-formed condition 206 and which may be assembled with the stringer 120 of FIG. 18 in the constant-gauge acreage 122 of the stringer 120. In an embodiment, the tip portion 220 of the radius filler 200 in the acreage 122 preferably includes from 4 to 9 slit tape tows 222, each of which may be approximately 0.25 inch wide. However, the tip portion 220 may include any number of slit tape tows 222 of any tow width 226. The base portion 238 of the radius filler 200 in the acreage 122 preferably includes from 5 to 17 three-ply stacks 254, although the base portion may include any number of three-ply stacks 254.

FIG. 19 is an example of a radius filler 200 as may be installed in in a relatively heavy-gauge acreage 122 section of a stringer 120. The radius filler 200 may have a tip portion 220 containing 16 continuous slit tape tows 222 each having a tow width 226 of approximately 0.125 inch, or 8 continuous slit tape tows 222 each having a tow width 226 of approximately 0.25 inch. The base portion 238 of the radius filler 200 in FIG. 19 consists of 14 three-ply stacks 254. In the as-stacked condition (not shown), the bottom stack 276 of the base portion 238 may have a bottom stack width (not shown) of approximately 1.1 inch and the uppermost mid stack 286 (e.g., located directly below the tip portion 220) may have a stack width (not shown) of approximately 0.16 inch.

FIG. 20 illustrates an example of a radius filler 200 in an as-formed condition 206 for a relatively light-gauge acreage 122 section, and wherein the above-described tip portion 220 contains the above-mentioned 8 slit tape tows 222 of 0.25 inch width. The base portion 238 of the radius filler 200 in FIG. 20 consists of 6 three-ply stacks 254. In FIG. 20, in the as-stacked condition (not shown), the bottom stack 276 of the base portion 238 has a bottom stack width (not shown) of approximately 0.73 inch and the uppermost mid stack 286 may have a mid stack width (not shown) of approximately 0.20 inch.

FIG. 21 is a sectional view of the uppermost 286 three-ply stack 254 of the base portion 238 of FIGS. 19 and 20 and illustrating the three composite plies 258 that make up the three-ply stack 254. As mentioned above, for a ply thickness 260 of approximately 0.0076 inch, the stack thickness 252 of each three-ply stack 254 is approximately 0.0228 inch. In a preferred embodiment, each three-ply stack 254 in the base portion 238 of the acreage 122 preferably has a fiber orientation angle 262 sequence consisting of a +30 degree ply 268, a −30 degree ply 272, and a 0 degree ply 264 located between the +30 degree ply 268 and the −30 degree ply 272.

FIG. 22 is a sectional view of the radius filler 200 taken in the constant-gauge runout 124 of the stringer 120 of FIG. 18. The tip portion 220 in a runout 124 preferably includes from 4 to 9 slit tape tows 222 of 0.25 inch width. The base portion 238 of the radius filler 200 in a runout 124 preferably includes from 5 to 10 two-ply stacks 256. A two-ply stack 256 contains no 0 degree plies 264, and is formed due to the termination in the transition zone 294 of the 0 degree ply 264 of the three-ply stack 254. In this regard, the termination of the 0 degree ply 264 in the transition zone 294 results in the runout 124 consisting of the +non-zero degree ply 266 and the −non-zero degree ply 270 in back-to-back contact with one another. Each two-ply stack 256 in the base portion 238 of a runout 124 preferably has a fiber orientation angle 262 sequence consisting of a +30 degree ply 268 and a −30 degree ply 272. In the cross-section of the radius filler 200 illustrated in FIG. 22, the base portion 238 consists of 6 three-ply stacks 254.

FIG. 23 is a sectional view of the uppermost 286 two-ply stack 256 of the base portion 238 of FIG. 22. The two composite plies 258 that make up the two-ply stack 256 are a +30 degree ply 268 and a −30 degree ply 272 and which are a continuation of such plies in the three-ply stack 254. For a ply thickness 260 of approximately 0.0076 inch, the stack thickness 252 of a two-ply stack 256 is approximately 0.0152 inch.

FIG. 24 is a side view of a hat stringer 172 having a hat-shaped cross-section. FIG. 25 is a sectional view of the hat stringer 172 taken along line 25 of FIG. 24 and illustrating a pair of asymmetric radius fillers installed in the hat stringer 172. The hat stringer 172 may be made up of a planar base charge 128, a trapezoidal wrap charge 178, a hat-shaped primary charge 176, and a pair of asymmetric radius fillers 200. The base charge 128, wrap charge 178, and primary charge 176 may each be separately formed as a laminate of composite plies 258. The assembly of the base charge 128, wrap charge 178, and primary charge 176 results in a pair of part cavities 142. In the hat stringer 172, the webs 132 may be oriented at a non-perpendicular web angle 218 to the flanges 134. In some examples, the web angle 218 on each side of the hat stringer 172 may be up to 105° or more. However, a hat stringer 172 may have webs 132 that are oriented at a perpendicular web angle 218 relative to the flanges 134. For hat stringer 172 examples where the webs 132 are oriented at a non-perpendicular web angle 218, the part cavity 142 has opposing outside radii 140 that may be unequal. However, the opposing outside radii 140 may be equal along one or more lengthwise sections and unequal along one or more other lengthwise sections of a hat stringer 172 having either perpendicular web angles 218 or non-perpendicular web angles 218. The web angle 218 for a hat stringer 172 may be constant along the lengthwise direction of the stringer 172. However, in other examples, the web angle 218 for a hat stringer 172 may vary along the lengthwise direction of the stringer 172.

In FIG. 25, the radius filler 200 in the as-stacked condition 204 is sized and configured to fill the part cavity 142 when the base charge 128 is assembled with the wrap charge 178 and primary charge 176. After assembly, the base charge 128, wrap charge 178, primary charge 176, and radius fillers 200 may be co-bonded or co-cured to a skin panel 116 (FIG. 1). In an alternative embodiment not shown, the base charge 128 may be omitted, and the wrap charge 178, primary charge 176, and radius fillers 200 may be assembled directly onto a skin panel (not shown) for co-curing or co-bonding.

FIG. 26 is a sectional view of a radius filler 200 in an as-formed condition 206 as may be installed in a part cavity of the hat stringer 172 of FIG. 25. The radius filler 200 in an as-formed condition 206 has an asymmetric shape 214 wherein the opposing radius filler sides 210 have unequal outside radii 140, as distinguished from a radius filler 200 having a symmetric shape 212 about a vertical centerline as shown in FIG. 5 wherein the outside radii 140 of the opposing radius filler sides 210 are equal. The asymmetrically-shaped radius filler 200 of FIG. 26 includes the tip portion 220 and the base portion 238, and is constructed in a manner similar to the above-described construction of a symmetrically-shaped radius filler 200. In addition, the radius filler 200 of FIG. 26 incorporates the above-described vertical overfill 248 criteria.

FIG. 27 is a sectional view of an example of a radius filler 200 in an as-stacked condition 204 having an asymmetric shape 214. In a preferable embodiment, the asymmetric radius filler 200 may be formed into an as-formed condition 207 (e.g., see FIGS. 28-30) and assembled with a stringer 120 to result in the as as-assembled condition 207 of the radius filler 200 shown in FIG. 25. However, in an alternative embodiment not shown, a symmetrically-shaped radius filler 200 in an as-stacked condition 204 may be formed into a radius filler 200 in an as-formed condition 206 having an asymmetric shape 214, and which may be assembled with a stringer 120 to result in the as-assembled condition 207 shown in FIG. 26.

FIGS. 28-30 illustrate an example of a process of forming a radius filler 200 having an asymmetric shape 214 in an as-stacked condition 204 into a radius filler 200 having an asymmetric shape 214 in an as-formed condition 206. FIG. 28 illustrates a radius filler 200 having an asymmetric shape 214 in an as-stacked condition 204 prior to installation into an asymmetrically-shaped die cavity 302 of a forming die 300 which may substantially duplicate the asymmetrical shape of a part cavity 142 into which the radius filler 200 is to be installed. Insertion of the radius filler 200 into the die cavity 302 and/or the application of heat 308 and/or pressure 306 causes the tip portion 220 and the base portion 238 to conform to the contour of the die cavity 302.

FIG. 29 shows the application of heat 308 and/or pressure 306 to the radius filler 200 within the forming die 300 after a pressure plate 304 is mounted on top of the forming die 300. The application of pressure 306 and the reduction in resin viscosity due to the application of heat 308 causes the base portion 238 and tip portion 220 to conform to the sides of the die cavity 302. FIG. 30 shows the radius filler 200 in the as-formed condition 206 having an asymmetric shape 214 after removal from the forming die 300. As indicated above, the radius filler 200 in the as-formed condition 207 may be installed in a part cavity of a stringer 120 to result in the radius filler shown in the as-assembled condition 207 in FIG. 25.

In any one of the examples disclosed herein, a radius filler 200 in the as-stacked condition 204, the as-formed condition 206, and/or the as-assembled condition 207 may have a symmetric shape 212 that is constant along an entire length of the radius filler 208. In other examples, a radius filler 200 in the as-stacked condition 204, the as-formed condition 206, and/or the as-assembled condition 207 may have an asymmetric shape 214 that is constant along an entire length of the radius filler 208. However, in other embodiments not shown, a radius filler 200 in the as-stacked condition 204, the as-formed condition 206, and/or the as-assembled condition 207 may include one or more lengthwise sections that have a symmetric shape 212 that transitions along the length of the radius filler 120 into an asymmetric shape 214. A radius filler 200 may have a symmetric shape 212 (FIG. 9) in an as-stacked condition 204 along an entire length of the radius filler 200, and at least a portion of the length of the symmetrically-shaped radius filler 200 in the as-stacked condition 204 may be formed into an asymmetric shape 214 (FIG. 26) and/or assembled into an asymmetric part cavity 142. In a preferred embodiment of a blade stringer 121, a radius filler 200 may be provided in a symmetric shape 212 in an as-stacked condition 204 and an as-formed condition 206, and may have an asymmetric shape 214 in an as-assembled condition 207 along at least a lengthwise portion of the radius filler 200 when installed in the part cavity 142 of the blade stringer 121. In a preferred embodiment of a hat stringer 172, a radius filler 200 may be provided in an asymmetric shape 214 in an as-stacked condition 204 and an as-formed condition 206, and may have an asymmetric shape 214 in an as-assembled condition 207 along at least a lengthwise portion of the radius filler 200 when installed in the part cavity 142 of the hat stringer 172.

FIG. 31 is a perspective view of a lengthwise section of a base portion 238 made up of a plurality of stacks 250. The base portion 238 has a variable cross-sectional shape as a result of tapers in the stack widths 278, 282 of one or more of the stacks 250. In addition, FIG. 31 illustrates the termination of the uppermost stack 286 of the base portion 238. As shown, a terminating end of a stack 250 may have a non-square shape such as a generally pointed shape or a rounded shape (not shown), and which may improve the ability of the radius filler 200 to fill the volume of the part cavity 142. However, a terminating end of a stack 250 may have a square shape (not shown). As mentioned above, changes in stack width 278, 282 and additions or dropping of stacks 250 are limited to the transition zones 294 of a radius filler 200. The acreage 122 and the runout 124 of a radius filler 200 have constant stack widths 278, 282 and do not have any additions or dropping of stacks 250. A transition zone 294 may interconnect a pair of acreage 122 sections, or a transition zone 294 may connect an acreage 122 section to a runout 124 (FIG. 37-38) located at one or both of opposing ends of a radius filler 200. The transition zone 294 comprises a change in at least one of a general base portion width 240 (FIG. 14) and a base portion height 242 (FIG. 14) in correspondence with the location of ply drops 156 and/or ply additions 162 along the lengthwise direction 202 of the composite structure 118 into which the radius filler 200 is to be installed.

FIG. 32 shows a lengthwise section of a composite spar 170 illustrating a part cavity 142 into which a radius filler 200 is to be installed. Also shown is the changing thickness of the spar 170 along the lengthwise direction 202 as a result of localized ply additions 162 and ply drops 156 in the spar 170. Ply additions 162 and ply drops 156 may result in variations in the outside radii 140 (FIGS. 3-4) along the lengthwise direction 202 of the spar 170. Advantageously, the variable cross-sectional shape of the radius filler 200 is complementary to the variations in outside radii 140 of the spar 170. In this manner, the inside radii 138 (FIGS. 3-4) of the spar 170 may be substantially constant along the lengthwise direction 202 which may improve the inspectability of the spar 170 and may reduce manufacturing costs. As described below, a symmetric radius filler 200 (e.g., FIG. 5) may be assembled to a composite structure (e.g., a symmetric composite spar) in a manner such that the lengthwise location of the transition zones 294 are slightly offset from the lengthwise location of ply drops 156 and/or ply adds in the composite structure.

Figure 33:
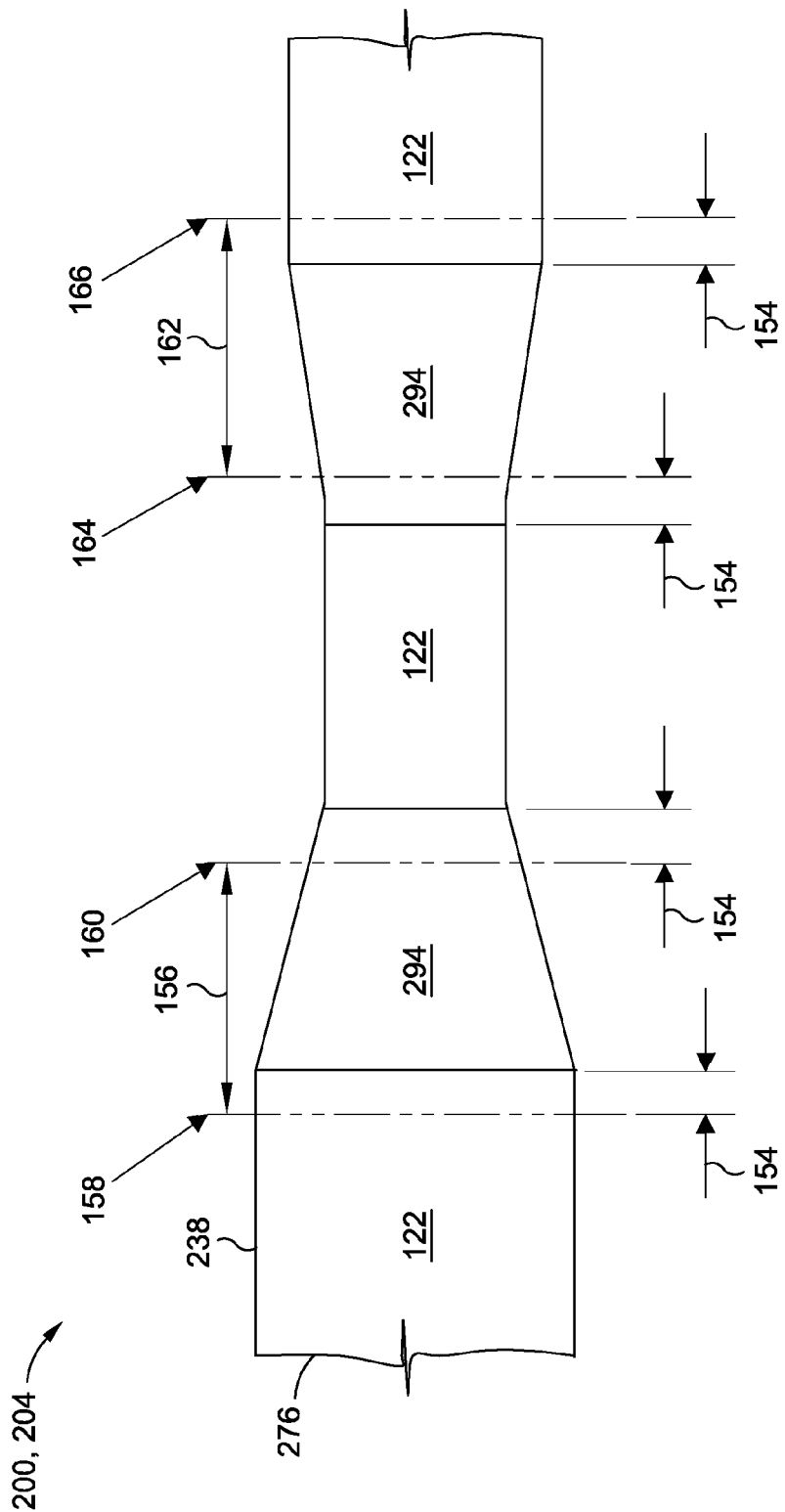
FIG. 33 is a diagrammatic representation of a schematic top view of a bottom stack of a base portion of a symmetric radius filler having transition zones that are offset from the start of a ply drop or a ply addition in a stringer into which the radius filler is to be installed.

FIG. 33 is a schematic top view of a bottom stack 276 of a base portion 238 of a symmetric radius filler 200 (e.g., FIG. 5) showing the offset 154 of a transition zone 294 from the start 158 and end 160 of a ply drop 156 in a stringer 120 having a symmetric cross-section (e.g., FIG. 3), and showing the offset 154 of another transition zone 294 from the start 164 and end 166 of a ply addition 162 to the stringer 120. The transition start 296 of a transition zone 294 may be located after the start 158 of a ply drop 156, and the transition end 298 of the transition zone 294 may be located after the end 160 of the ply drop 156. For ply additions 162 to the stringer 120, the transition start 296 of a transition zone 294 may be located before the start 164 of a ply addition 162, and the transition end 298 of the transition zone 294 may be located before the end 166 of the ply addition 162. For radius fillers having a symmetric shape (e.g., FIG. 5), a transition zone 294 may be offset 154 from the start of a ply drop 156 or ply addition 162 by a distance of approximately 0.10 to 0.50 inch or more. As indicated above, offsetting the transition zone 294 from the start and end of ply drops 156 and ply additions 162 in the stringer 120 improves the ability of the radius filler 200 to fill the part cavity 142, and which results in an improvement in the strength, stiffness, and inspectability of the composite structure 118. For asymmetric radius fillers 200 (e.g., FIG. 28), the transition zones 294 may not be offset from ply drops 156 or ply additions 162.

Figure 34:
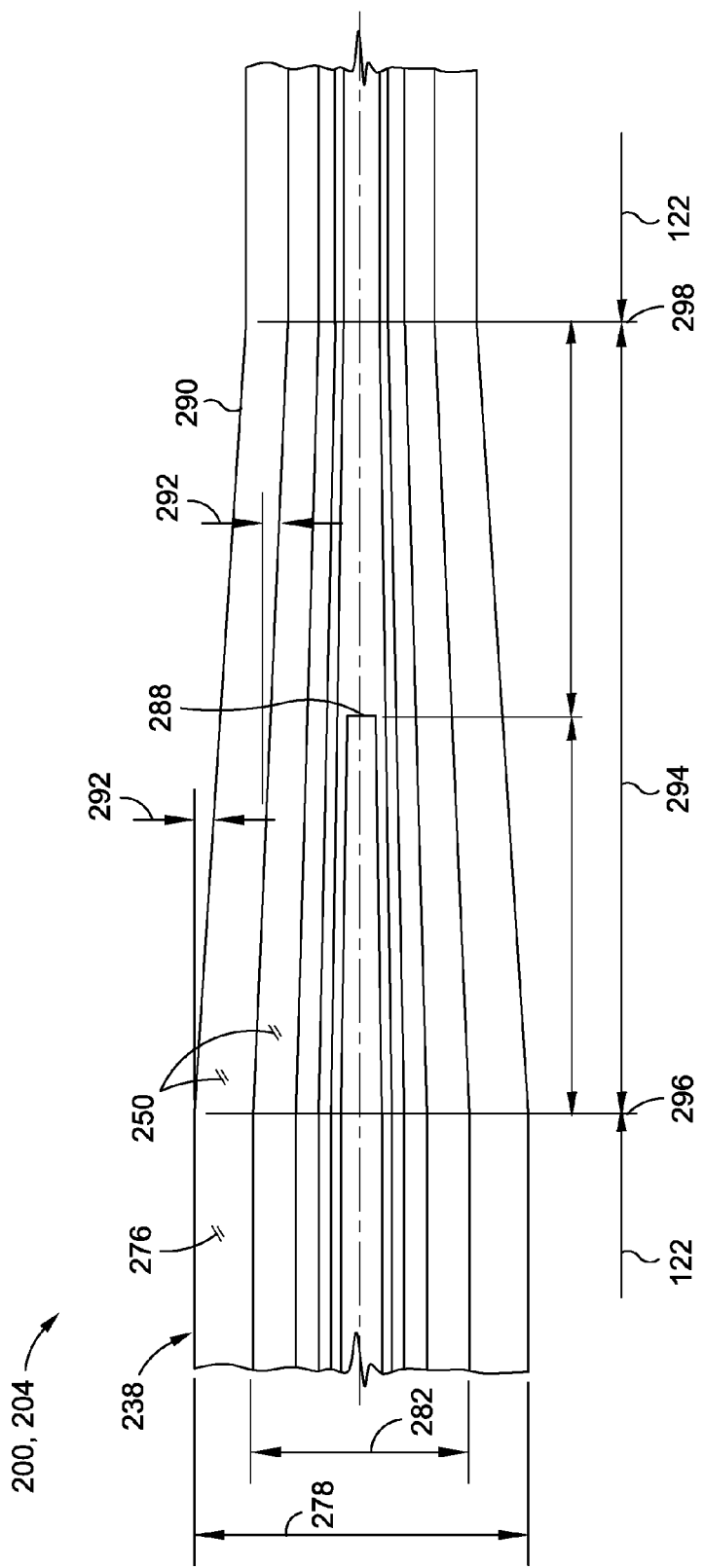
FIG. 34 is a diagrammatic representation of a top view of a base portion of a radius filler illustrating a transition zone within which one of the stacks of the base portion terminates.
Figure 35:
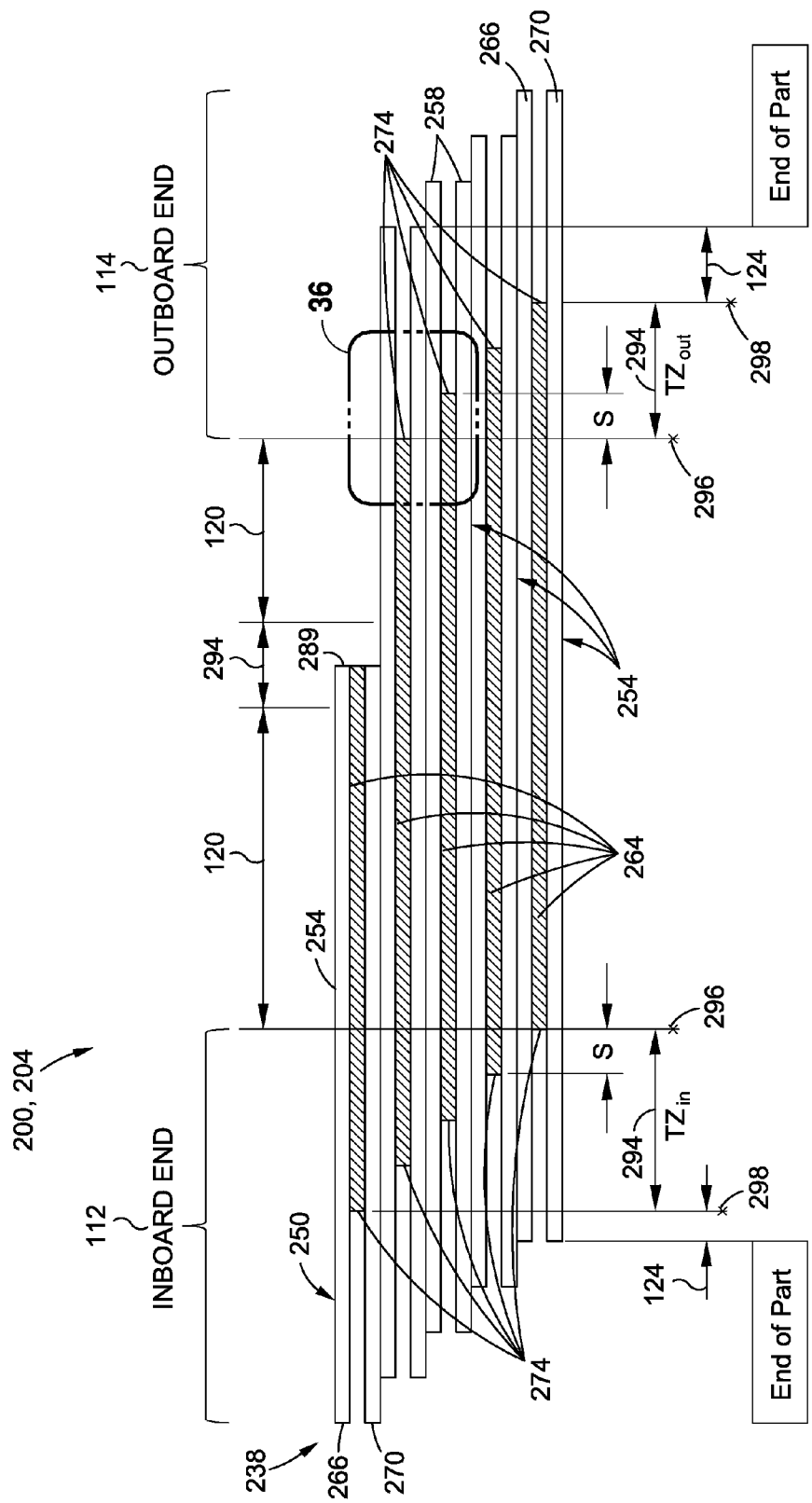
FIG. 35 is a diagrammatic representation of a side sectional view of a base portion illustrating the ply termination of the 0 degree plies within the transition zone at each of opposing ends of the radius filler.

FIG. 34 is a top view of a base portion 238 of a radius filler 200 in an as-stacked condition 204 and illustrating a transition zone 294 interconnecting two acreage 122 sections. As indicated above, within each acreage 122 section, the stack widths 278, 282 of the stacks 250 in the base portion 238 are constant, and there are no additions or dropping of stacks 250 (i.e., no stack terminations), the combined effect of which results in the radius filler sides 210 (FIG. 5) having a constant radius along the length of the acreages 120. Within the transition zones 294, one or more stacks 250 may be added or dropped. In a stack termination 288, all of the plies 258 in the stack 250 terminate at the same location as shown in FIG. 35 described below. In the example of FIG. 34, the stack termination 288 is shown located approximately midway between the transition start 296 and the transition end 298. However, a radius filler 200 may include any number of transitions zones 294 at any location along the lengthwise direction 202 of the radius filler 200 in correspondence with ply drops 156 and ply additions 162 in the stringer 120.

For transition zones 294 having two or more stack terminations 288, the spacing between the stack terminations 288 and the transition start 296 and transition end 298 may be equal to the length of the transition zone 294 divided by the total quantity of stack terminations 288. In addition, within each transition zone 294, the stack widths 278, 282 of one or more of the stacks 250 may change or vary linearly between adjacent acreage 122 sections. In FIG. 34, a change in stack width 278, 282 may comprise a taper 290 that extends from the transition start 296 to the transition end 298. In the example shown, the stacks 250 have taper angles 292 that differ from one another. The combined effect of stack terminations 288 and changes in stack width 278, 282 in a transition zone 294 results in the radius filler sides 210 (FIG. 5) having a varying radius along the lengthwise direction 202 of the transition zone 294.

FIG. 35 is a diagrammatic side sectional view of a base portion 238 of a radius filler 200 in the as-stacked condition 204 and illustrating a stack termination 288 of a three-ply stack 254 within a transition zone 294 interconnecting two acreage 122 sections in the approximate lengthwise middle of the radius filler 200. Also shown are ply terminations 274 of the 0 degree plies 264 at a transition zone 294 at each of the inboard end 112 and the outboard end 114 of the radius filler 200, and wherein each transition zone 294 connects an acreage 122 to a runout 124. In the transition zones 294 at the inboard end 112 and the outboard end 114, the 0 degree ply 264 in each of the three-ply stacks 254 terminates at a ply termination 274 located either at the transition start 296, at the transition end 298, or within the transition zone 294.

Advantageously, prior to layup of the base portion 238, a plurality of three-ply stacks 254 can be manufactured by laying up a three-ply laminate (not shown) consisting of a +non-zero degree ply sheet (not shown), a −non-zero degree ply sheet (not shown), and a 0 degree ply sheet (not shown) located between the sheets (not shown) of the +non-zero degree ply and the −non-zero degree ply. As shown in FIG. 35, a sheet for the 0 degree ply 264 of a stack 250 may be provided in a length that will extend from the transition zone 294 at one stringer end 126 to the transition zone 294 at the opposite stringer end 126. However, although not shown, the present disclosure contemplates that a 0 degree ply 264 may extend beyond an end of the radius filler 200. A sheet for the +non-zero degree ply 266 and the −non-zero degree ply 270 may each be provided in equal lengths. In addition, a sheet for the +non-zero degree ply 266 and the −non-zero degree ply 270 may each be longer than the sheet for the 0 degree ply 264 such that the stacks 250 will extend beyond the ends of the part (e.g., ends of the stringer) and can be trimmed off at a later time. In addition, the +non-zero degree ply 266 sheet and the −non-zero degree ply 270 sheet may each be provided in a length such that the ends of the +non-zero degree ply 266 and the −non-zero degree ply 270 extend beyond each one of the opposing ends of the 0 degree ply 264, as shown in FIG. 35. After assembly, the three-ply laminate sheet can be slit along a lengthwise direction 202 into a plurality of individual three-ply stacks 254, each having the required stack width 278, 282 as described above with regard to FIG. 14. The individual three-ply stacks 254 may be stacked on top of one another to form the stepped pyramidal cross-sectional shape of the base portion 238 with the required vertical overfill 248, as described above and illustrated in FIG. 14.

Figure 36:
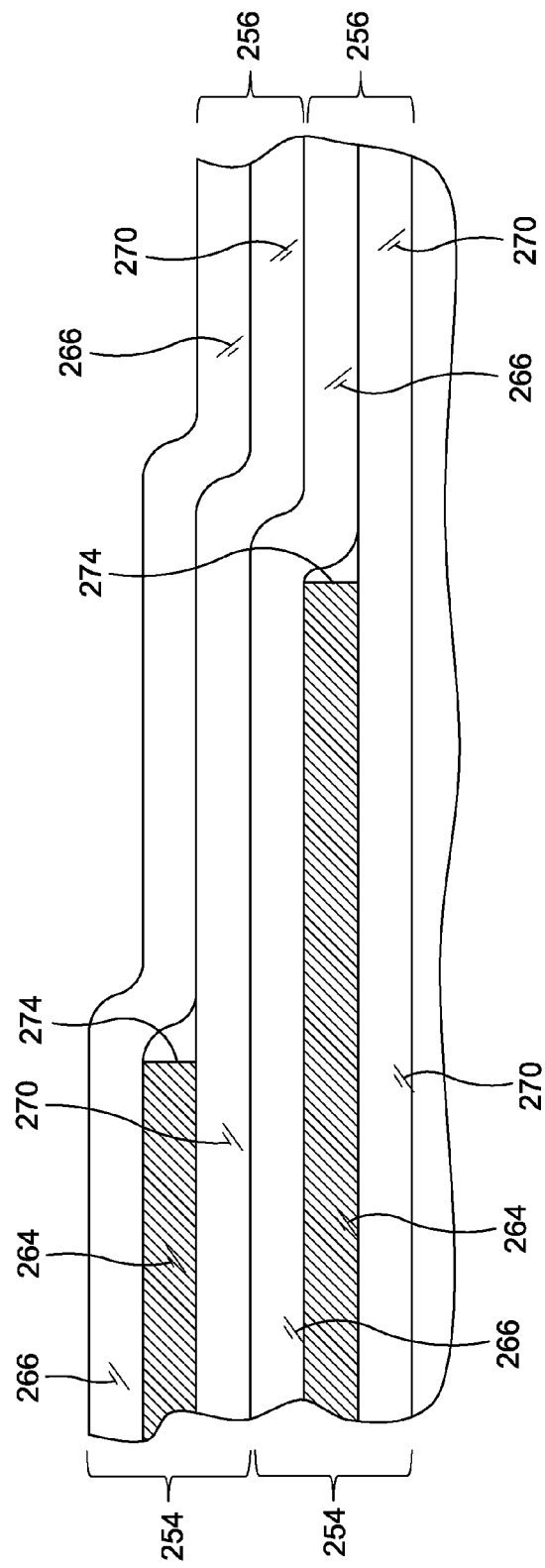
FIG. 36 is a diagrammatic representation of a magnified view of the top two stacks of the base portion and illustrating the ply termination within the transition zone of the 0 degree plies of each one of the stacks.

Referring still to FIG. 35, when assembling the stacks 250 to form the base portion 238, the individual stacks 250 can be staggered along a lengthwise direction 202 such that at the transition zones 294, the ply terminations 274 of the 0 degree plies 264 are spaced apart from one another. More specifically, for the transition zone 294 on at least one stringer end 126, the ply terminations 274 are spaced apart from one another and from the transition start 296 and transition end 298 by a distance approximately equal to the length of the transition zone 294 divided by the total quantity of ply terminations 274 (e.g., of 0 degree plies 264) at the transition start 296, at the transition end 298, and/or within the transition zone 294. The termination of the 0 degree ply 264 of a three-ply stack 254 results in a two-ply stack 256 containing a +non-zero degree ply 266 and a −non-zero degree ply 270 in back-to-back contact with one another, as shown in FIG. 36.

Figure 37:
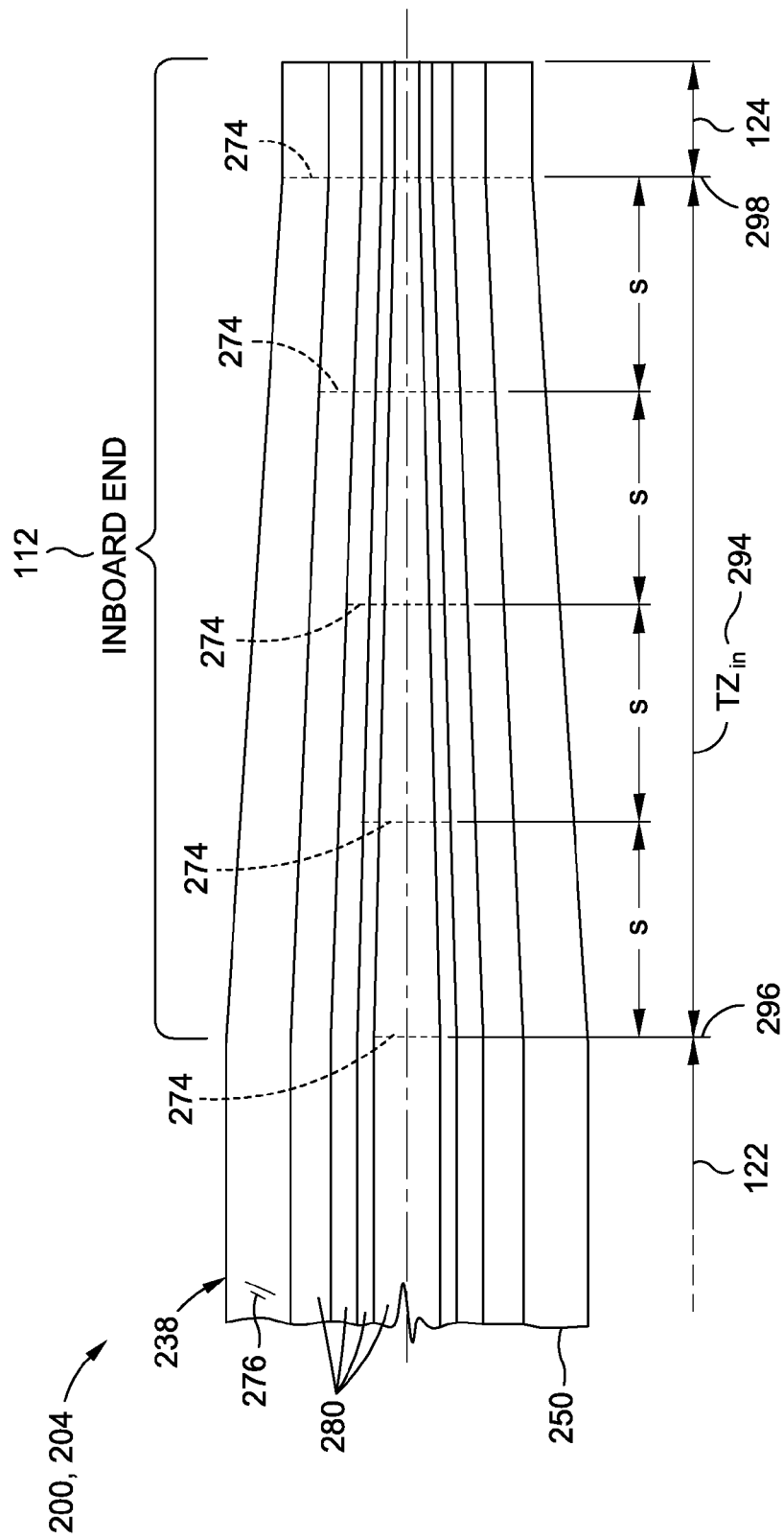
FIG. 37 is a diagrammatic representation of a top view rotated 180° of the transition zone at an inboard end of the base portion of FIG. 35 and illustrating the spacing of the zero-degree ply terminations.
Figure 38:
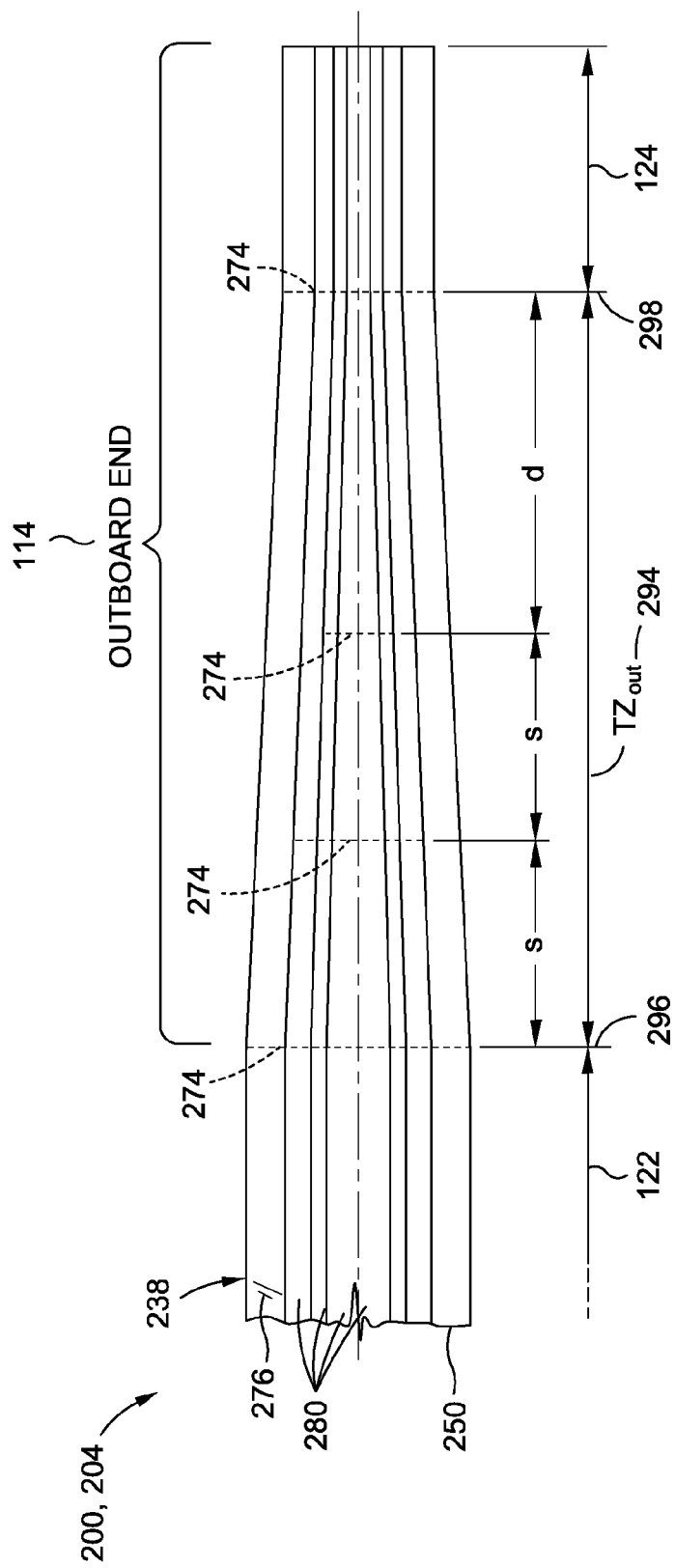
FIG. 38 is a diagrammatic representation of a top view of the transition zone at the outboard end of the base portion of FIG. 35 and illustrating the spacing of the zero-degree ply terminations.

FIG. 37 is a top view rotated 180° of the transition zone 294 at the inboard end 112 of the base portion 238 of FIG. 35 and showing the equal spacing s between the ply terminations 274 of the 0 degree plies 264. FIG. 38 is a top view of the transition zone 294 at the outboard end 114 of the base portion 238 of FIG. 35 and showing the spacing s of the zero-degree ply terminations 274. The spacing s at the inboard end 112 and the outboard end 114 may be determined using the following relationship:

$$s = \text{lessor of } x_{in} \text{ and } x_{out} \quad \text{(Equation 100)}$$

wherein:
$x_{in} = TZ_{in}/d_{in}$
$x_{out} = TZ_{out}/d_{out}$ $T_{in}$=length of the transition zone 294 at the inboard end 112
$TZ_{out}$=length of the transition zone 294 at the outboard end 114
$T_{in} \neq TZ_{out}$
$d_{in}$=quantity of 0 degree plies 264 dropped at the runout 124 at the inboard end 112
$d_{out}$=quantity of 0 degree plies 264 dropped at the runout 124 at the outboard end 114

As indicated above, a stringer 120 may be configured such that the transition zone 294 at one end of the stringer 120 is a different length than the transition zone 294 at the opposite end of the stringer 120. For example, in FIGS. 37-38, the transition zone 294 at the inboard end 112 is longer than the transition zone 294 at the outboard end 114. In such case, the distance d from the transition end 298 to the nearest 0 degree ply 264 termination may be described using the following relationship:

$$d = TZ_{in} - (d_{in} - 1)(s) \quad \text{(Equation 110)}$$

Figure 39:
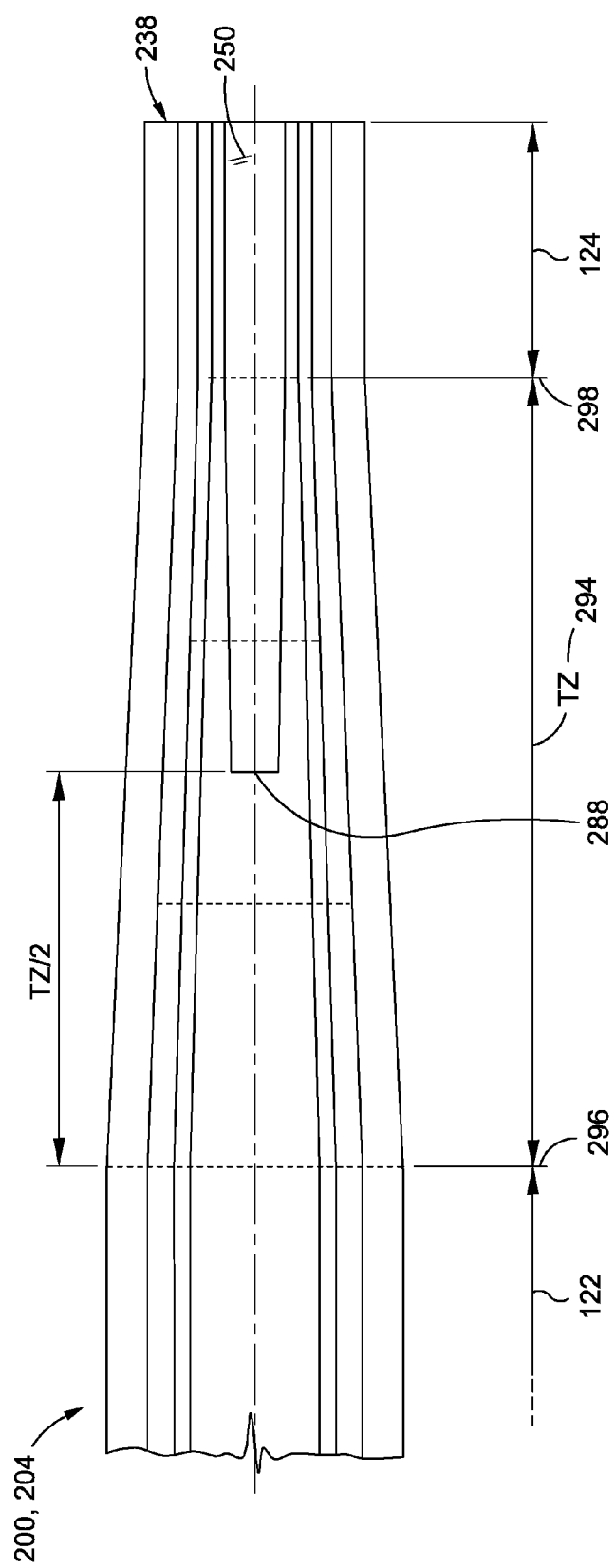
FIG. 39 is a diagrammatic representation of a top view of an example of a two-ply stack added to the runout and terminating within the transition zone of the radius filler.

FIG. 39 is a top view of an example of a two-ply stack 256 added to the runout 124 and terminating at a stack termination 288 within the transition zone 294 of the radius filler 200. The two-ply stack 256 may be added to increase the height of the base portion 238 in the runout 124 in order to meet the above-mentioned vertical overfill 248 (FIG. 14) criteria. As indicated above, the vertical overfill 248 improves compaction of the stringer 120 and reduces crack susceptibility which improves the structural performance of the stringer 120 such as improved pull-off strength. In the example shown, the stack termination 288 of the added two-ply stack 256 may be located midway between the transition start 296 and the transition end 298. For transition zones 294 having two or more stack terminations 288 (not shown) of two-ply stacks 256 originating in the runout 124, the stack terminations 288 may be equally spaced from one another and from the transition start 296 and the transition end 298.

Figure 40:
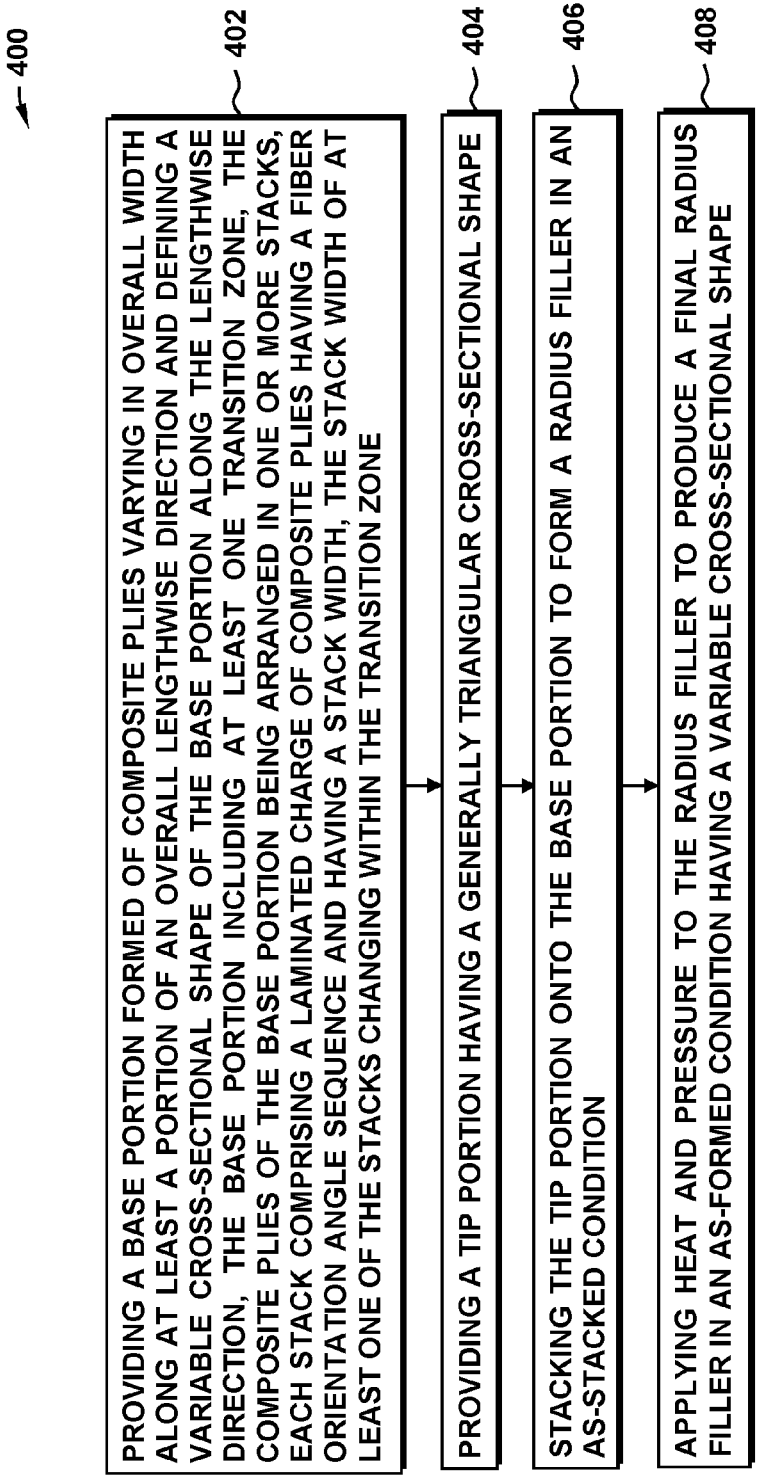
FIG. 40 is a flow diagram illustrating one or more operations that may be included in a method of manufacturing a composite radius filler.

FIG. 40 is a flow diagram illustrating one or more operations that may be included in a method 400 of manufacturing a composite radius filler 200. Step 402 of the method 400 includes providing a base portion 238 formed of composite plies 258 varying in overall width along at least a portion of an overall lengthwise direction 202 and defining a variable cross-sectional shape of the base portion 238 along the lengthwise direction 202. As described above, the base portion 238 includes at least one transition zone 294 having a transition start 296 and a transition end 298 along the lengthwise direction 202. The composite plies 258 of the base portion 238 are arranged in one or more stacks 250. Each stack 250 comprises a laminated charge of composite plies 258 having a predetermined fiber orientation angle 262 sequence and having a stack width 278, 282. The stack width 278, 282 of at least one of the stacks 250 changes within the transition zone 294.

The step of providing the base portion 238 includes providing at least one stack 250 of the base portion 238 as a laminated charge in the form of a three-ply stack 254 (FIG. 13) consisting of a +non-zero degree ply 266, a −non-zero degree ply 270, and a 0 degree ply 264 laminated between the +non-zero degree ply 266 and the −non-zero degree ply 270. The absolute value of the fiber orientation angle 262 of the +non-zero degree ply 266 and the −non-zero degree ply 270 is equal (e.g., ±5 degrees). In a specific embodiment, the step of providing at least one stack 250 of the base portion 238 includes providing at least one stack 250 of the base portion 238 as a laminated charge consisting of a +30 degree ply 268, a −30 degree ply 272, and a 0 degree ply 264 located between the +30 degree ply 268 and the −30 degree ply 272.

As mentioned above, changes in stack width 278, 282 are limited to the transition zone 294, and do not occur in the acreage 122 or the runout 124 which are constant-gauge sections of the radius filler 200. The changes in stack width 278, 282 are linearly varying and form a taper 290 (FIG. 34) extending from the transition start 296 to the transition end 298. At least two of the stacks 250 have taper angles 292 that differ from one another. For example, FIG. 34 illustrates a taper 290 in each one of the stacks 250 in the transition zone 294 which is shown interconnecting a pair of acreage 122 sections on opposite sides of the transition zone 294.

In addition to tapering the stack widths 278, 282 within the transition zone 294, the method may further include terminating, in at least one of the stacks 250, the 0 degree ply 264 at a ply termination 274 located within a transition zone 294. As a result of the ply termination 274 of a 0 degree ply, a three-ply stack 254 (e.g., in an acreage 122) transitions to a two-ply stack 256 which consists of the +non-zero degree ply 266 (e.g., a +30 degree ply 268) and the −non-zero degree ply 270 (e.g., a −30 degree ply 272) in back-to-back contact with one another as illustrated in FIG. 36. The step of terminating a 0 degree ply 264 comprises locating the ply termination 274 at either the transition start 296, within the transition zone 294 (i.e., between the transition start 296 and transition end 298), or at the transition end 298. In some examples, a plurality of 0 degree plies 264 may be terminated such as illustrated in FIG. 38. In such an arrangement, the method may include spacing the ply terminations 274 of the 0 degree plies 264 apart from one another and from the transition start 296 and transition end 298 at a spacing s approximately equal to the length of the transition zone 294 divided by the total quantity of ply terminations 274 at the transition start 296, within the transition zone 294, and at the transition end 298, similar to the arrangement shown in FIG. 37. The ply terminations 274 at an opposite end of the radius filler 200 may also utilize the same spacing between some of the ply terminations 274 and may have a different distance d between the ply termination 274 located nearest the transition, similar to the arrangement described above with regard to FIG. 38.

Step 404 of the method 400 includes providing a tip portion 220 which has a generally triangular cross-sectional shape as shown in FIG. 6. The step of providing the tip portion 220 may include pultruding a plurality of prepreg unidirectional slit tape tows 222 into the generally triangular cross-sectional shape. For example, FIG. 7 illustrates an example of a system that may be implemented for drawing a plurality of unidirectional slit tape tows 222 from spools 224 and passing the slit tape tows 222 through a pultrusion die 310 as shown in FIG. 9. In one example, the unidirectional slit tape tows 222 (FIG. 8) may be provided in a tow width 226 of between approximately 0.12 to 0.50 inch prior to pultruding into the generally triangular cross-sectional shape, although other tow widths 226 are contemplated.

Step 406 of the method 400 includes stacking the tip portion 220 onto the base portion 238 to form a radius filler 200 in an as-stacked condition 204, an example of which is illustrated in the above-described FIG. 6. As mentioned above, the radius filler 200 is configured to be installed in a part cavity 142 of a composite structure 118. The part cavity 142 has a cavity height 150 measured from a cavity base 146 to a cavity apex 148. The tip portion 220 has a tip portion bottom surface 228. The base portion 238 has a base portion bottom surface 246 and a base portion height 242.

The method 400 includes forming the radius filler 200 with a vertical overfill 248 (FIG. 14) of the part cavity 142. As mentioned above, vertical overfill 248 may be achieved by designing the radius filler 200 such that: (1) the as-stacked base portion height 242 of the radius filler 200 in the as-stacked condition 204 is at least 5 percent greater than an as-assembled base portion height 243 of the radius filler 200 in the as-assembled condition 207, and (2) the as-stacked base portion height 242 of the radius filler 200 in the as-stacked condition 204 is at least one additional ply thickness 260 (e.g., FIGS. 21, 23) beyond the as-assembled base portion height 243. As mentioned above, vertical overfill 248 of the radius filler 200 into a part cavity 142 advantageously results in improved compaction of the composite structure 118 (e.g., stringer 120) and reduces susceptibility to cracking which translates into an improvement in the structural performance of the stringer 120, including improved pull-off strength of the stringer 120.

In some examples, the radius filler 200 may be formed with vertical overfill 248 and without horizontal overfill. In this regard, the method may include forming the base portion 238 from a single bottom stack 276 and a plurality of mid stacks 280 each having a stack width 282 that matches the nominal width of the part cavity 142 as shown in FIG. 14. In this regard, the method may include forming the radius filler 200 in the as-stacked condition 204 such that the stack width 282 of each of the mid stacks 280 is substantially equivalent (within ±0.010 inch) to the part cavity width 152 at the intersection of the cavity sides 144 with the mid-plane 284 of the mid stack 250, as described above with regard to FIG. 14. The bottom stack 276 has a bottom stack width 278 that is less than the part cavity width 152 at a part cavity 142 bottom surface (FIG. 14). For example, the bottom stack width 278 is approximately 0.10 inch (±0.010 inch) less than the part cavity bottom width 153.

Step 408 of the method 400 includes applying heat 308 and/or pressure 306 to the radius filler 200 to produce a radius filler 200 in as as-formed condition 206. In some examples, the radius filler 200 may be assembled into a symmetric shape 212 (FIG. 6) in an as-stacked condition 204, which may be formed into a symmetric shape 212 in an as formed condition 206, such as by applying heat 308 and/or pressure 306 to the as-stacked radius filler 200 within a forming die 300 as described above with regard to FIGS. 15-17. In other examples, a radius filler 200 may be assembled into an asymmetric shape 214 (FIG. 27) in an as-stacked condition 204. In some examples, at least a lengthwise section of a radius filler 200 with an asymmetric shape 214 in the as-stacked condition 204 may be formed into an asymmetric shape 214 in an as-formed condition 206, such as by using a forming die 300 having an asymmetrical die cavity 302 as described above with regard to FIG. 28-30, or by using any one of a variety of alternative forming means.

When forming the as-stacked radius filler 200 into the as-formed condition 206, the method may include forming the opposing radius filler sides 210 of the radius filler 200 into a contour that is complementary to the corresponding cavity sides 144 of the part cavity 142 (FIGS. 3-4) which extends along the lengthwise direction 202 of the composite structure 118. For example, each one of the radius filler sides 210 may be formed into a radius that substantially matches the radius of the cavity sides 144.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A composite radius filler, comprising:
a base portion formed of composite plies varying in overall width along an overall lengthwise direction and defining a variable cross-sectional shape of the base portion along the lengthwise direction, the base portion including at least one transition zone having a transition start and a transition end along the lengthwise direction;
the composite plies of the base portion being arranged in one or more stacks of composite plys, the composite plys of the base portion being parallel to each other, at least one of the one or more stacks comprising a laminated charge of composite plies having a predetermined fiber orientation angle sequence and having a stack width, the stack width of at least one of the stacks changing within the transition zone; and
a tip portion comprised of a plurality of composite plies that are discrete from the composite plys of the base portion, the composite plys of the tip portion being formed into a generally triangular cross-sectional shape and having one or more composite plys that are non-parallel to the composite plys of the base portion, the tip portion being stacked on top of the base portion.

2. The radius filler of claim 1, wherein:
the composite plies in the tip portion are pultruded unidirectional slit tape tows.

3. The radius filler of claim 1, wherein:
the radius filler has a symmetric shape in an as-stacked condition.

4. The radius filler of claim 1, wherein:
the radius filler has an asymmetric shape in an as-stacked condition.

5. The radius filler of claim 1, wherein:
at least one of the one or more stacks has a fiber orientation angle sequence comprising a +non-zero degree ply, a −non-zero degree ply, and a 0 degree ply in between the +non-zero degree ply and the −non-zero degree ply; and
the absolute value of a fiber orientation angle of the +non-zero degree ply and the −non-zero degree ply being equal.

6. The radius filler of claim 5, wherein:
the fiber orientation angle sequence of the at least one of the one or more stacks comprising a +30 degree ply, a −30 degree ply, and a 0 degree ply in between the +30 degree ply and the −30 degree ply.

7. The radius filler of claim 5, wherein:
in at least one of the stacks, the 0 degree ply terminates at a ply termination, and resulting in at least one lengthwise portion of the stack comprising the +non-zero degree ply and the −non-zero degree ply in back-to-back contact with one another.

8. The radius filler of claim 7, wherein the ply termination of the 0 degree ply is located at one of the following:
at the transition start;
within the transition zone; and,
at the transition end.

9. The radius filler of claim 1, wherein:
the radius filler is configured to be installed in a part cavity of a composite structure and in an as-assembled condition within the part cavity, the part cavity having a cavity base;
the tip portion having a tip portion bottom surface;
the base portion having a base portion bottom surface and a base portion height;
the base portion providing the radius filler with a vertical overfill of the part cavity wherein:
an as-stacked base portion height of the radius filler in the as-stacked condition is at least 5 percent greater than an as-assembled base portion height of the radius filler in the as-assembled condition; and
the as-stacked base portion height is at least one additional ply thickness beyond the as-assembled base portion height;
the as-stacked base portion height extending from the base portion bottom surface to the tip portion bottom surface of the radius filler in the as-stacked condition; and
the as-assembled base portion height extending from the cavity base to the location of the tip portion bottom surface if the tip portion were in the part cavity in the as-assembled condition.

10. The radius filler of claim 9, wherein:
the part cavity has opposing cavity sides respectively defined by opposing outside radii of the composite structure;
the base portion including a single bottom stack and a plurality of mid stacks each having a stack width; and
the stack width of all of the mid stacks being substantially equivalent to a part cavity width at an intersection of the cavity sides with a mid-plane of the respective mid stack.

11. A composite structure, comprising:
a pair of composite charges in back-to-back contact with one another and forming a lengthwise part cavity;
a radius filler installed in the part cavity and including:
a base portion formed of composite plies varying in overall width along an overall lengthwise direction and defining a variable cross-sectional shape of the base portion along the lengthwise direction, the base portion including at least one transition zone having a transition start and a transition end along the lengthwise direction;
the composite plies of the base portion being arranged in one or more stacks of composite plys, the composite plys of the base portion being parallel to each other, at least one of the one or more stacks comprising a laminated charge of composite plies having a predetermined fiber orientation angle sequence and having a stack width, the stack width of at least one of the stacks changing within the transition zone; and
a tip portion comprised of a plurality of composite plies that are discrete from the composite plys of the base portion, the composite plys of the tip portion being formed into a generally triangular cross-sectional shape and having one or more composite plys that are non-parallel to the composite plys of the base portion, the tip portion being stacked on top of the base portion.

12. A method of manufacturing a radius filler, comprising the steps of:
providing a base portion formed of composite plies varying in overall width along at least a portion of an overall lengthwise direction and defining a variable cross-sectional shape of the base portion along the lengthwise direction, the base portion including at least one transition zone having a transition start and a transition end along the lengthwise direction, the composite plies of the base portion being arranged in one or more stacks of composite plys, the composite plys of the base portion being parallel to each other, at least one of the one or more stacks comprising a laminated charge of composite plies having a predetermined fiber orientation angle sequence and having a stack width, the stack width of at least one of the stacks changing within the transition zone;

providing a tip portion comprised of a plurality of composite plies that are discrete from the composite plys of the base portion, the composite plys of the tip portion being formed into a generally triangular cross-sectional shape and having one or more composite plys that are non-parallel to the composite plys of the base portion;

stacking the tip portion onto the base portion to form a radius filler in an as-stacked condition; and applying at least one of heat and pressure to the radius filler to produce a radius filler in as-formed condition having a variable cross-sectional shape.

13. The method of claim 12, wherein the step of providing the tip portion comprises:

pultruding a plurality of unidirectional slit tape tows into the generally triangular cross-sectional shape.

14. The method of claim 12, further including:

forming the radius filler into a symmetric shape in an as-stacked condition.

15. The method of claim 12, further including:

forming the radius filler into an asymmetric shape in an as-stacked condition.

16. The method of claim 12, wherein the step of providing the base portion includes:

providing at least one stack of the base portion as a laminated charge comprising a +non-zero degree ply, a −non-zero degree ply, and a 0 degree ply in between the +non-zero degree ply and the −non-zero degree ply, the absolute value of a fiber orientation angle of the +non-zero degree ply and the −non-zero degree ply being equal.

17. The method of claim 16, wherein the step of providing at least one stack of the base portion as a laminated charge includes:

providing at least one stack of the base portion as a laminated charge comprising a +30 degree ply, a −30 degree ply, and a 0 degree ply in between the +30 degree ply and the −30 degree ply.

18. The method of claim 16, further including:

terminating, in at least one of the stacks, the 0 degree ply at a ply termination located within an overall length of the radius filler, such that in at least one lengthwise section of the radius filler, the stack comprising the +non-zero degree ply and the −non-zero degree ply in back-to-back contact with one another.

19. The method of claim 18, wherein the step of terminating the 0 degree ply comprises locating the ply termination at one of the following:

at the transition start;

within the transition zone; and, at the transition end.

20. The method of claim 12, wherein the radius filler is configured to be installed in a part cavity of a composite structure and in an as-assembled condition within the part cavity, the part cavity having a cavity base, the tip portion having a tip portion bottom surface, the base portion having a base portion bottom surface and a base portion height, the method further including:

forming the radius filler with a vertical overfill of the part cavity wherein:

an as-stacked base portion height of the radius filler in the as-stacked condition is at least 5 percent greater than an as-assembled base portion height of the radius filler in the as-assembled condition; and the as-stacked base portion height is at least one additional ply thickness beyond the as-assembled base portion height;

the as-stacked base portion height extending from the base portion bottom surface to the tip portion bottom surface of the radius filler in the as-stacked condition; and the as-assembled base portion height extending from the cavity base to the location of the tip portion bottom surface if the tip portion were in the part cavity in the as-assembled condition.

21. The method of claim 20, wherein the part cavity has opposing cavity sides respectively defined by opposing outside radii of the composite structure, the method further including:

forming the base portion from a single bottom stack and a plurality of mid stacks each having a stack width; and forming the radius filler in an as-stacked condition such that the stack width of all of the mid stacks is substantially equivalent to a part cavity width at an intersection of a cavity side with a mid-plane of the respective mid stack.

22. The method of claim 21, wherein:

the bottom stack has a bottom stack width that is less than the part cavity width at a part cavity bottom surface.

\* \* \* \* \*